(12) United States Patent
Christoph et al.

(10) Patent No.: US 8,711,365 B2
(45) Date of Patent: Apr. 29, 2014

(54) COORDINATE MEASURING DEVICE AND METHOD FOR MEASURING WITH A COORDINATE MEASURING DEVICE

(71) Applicants: Ralf Christoph, Giessen (DE); Wolfgang Rauh, Lahntal (DE); Matthias Andras, Florstadt (DE); Uwe Wachter, Oberteuringen (DE)

(72) Inventors: Ralf Christoph, Giessen (DE); Wolfgang Rauh, Lahntal (DE); Matthias Andras, Florstadt (DE); Uwe Wachter, Oberteuringen (DE)

(73) Assignee: Werth Messtechnik GmbH, Giessen (DE)

( * ) Notice: Subject to any disclaimer, the term of this patent is extended or adjusted under 35 U.S.C. 154(b) by 0 days.

(21) Appl. No.: 13/686,720

(22) Filed: Nov. 27, 2012

(65) Prior Publication Data
US 2013/0167389 A1    Jul. 4, 2013

Related U.S. Application Data

(63) Continuation of application No. 11/721,854, filed as application No. PCT/EP2005/013526 on Dec. 16, 2005, now abandoned.

(30) Foreign Application Priority Data

Dec. 16, 2004  (DE) .......................... 10 2004 611 151

(51) Int. Cl.
*G01B 11/02* (2006.01)
*G01B 11/14* (2006.01)
*G01B 5/004* (2006.01)
*G01B 5/00* (2006.01)

(52) U.S. Cl.
USPC ................ 356/496; 356/614; 33/503; 33/702

(58) Field of Classification Search
USPC .............................. 356/496, 614; 33/503, 702
See application file for complete search history.

(56) References Cited

U.S. PATENT DOCUMENTS

| | | | |
|---|---|---|---|
| 4,785,545 A | 11/1988 | Aubele | |
| 4,912,328 A | 3/1990 | Kato et al. | |
| 4,957,369 A * | 9/1990 | Antonsson | ..................... 356/608 |
| 5,014,144 A | 5/1991 | Sato et al. | |
| 5,031,331 A | 7/1991 | Herzog et al. | |
| 5,615,489 A | 4/1997 | Breyer et al. | |
| 7,188,432 B2 * | 3/2007 | Schepperle et al. | ............. 33/702 |
| 8,077,327 B2 * | 12/2011 | Fujishima et al. | ............. 356/601 |

(Continued)

FOREIGN PATENT DOCUMENTS

| | | |
|---|---|---|
| DE | 9747027 A1 | 10/1998 |
| DE | 19747027 A1 | 10/1998 |

(Continued)

OTHER PUBLICATIONS

European Search Report issued Aug. 21, 2013, corresponding to European Patent Application No. 10 18 5239.0.

(Continued)

*Primary Examiner* — Michael A Lyons
(74) *Attorney, Agent, or Firm* — Ladas & Parry LLP

(57) ABSTRACT

The invention relates to a method for the measurement of workpiece geometries with a coordinate measuring device (10) and to the device itself. According to the invention, measuring tasks may be optimally carried out without a requirement for devices of differing types, whereby one or more sensors (30), which are of optimal application for the relevant measuring task, are used.

7 Claims, 14 Drawing Sheets

(56) References Cited

U.S. PATENT DOCUMENTS

| | | |
|---|---|---|
| 2001/0003464 A1 | 6/2001 | Niikawa |
| 2004/0184039 A1* | 9/2004 | Christoph ............ 356/601 |
| 2006/0007449 A1 | 1/2006 | Christoph |

FOREIGN PATENT DOCUMENTS

| | | |
|---|---|---|
| EP | 0473010 A2 | 3/1992 |
| EP | 546784 A2 * | 6/1993 |
| EP | 1128156 A1 | 8/2001 |
| GB | 2227563 A | 8/1990 |
| JP | 58122414 A | 7/1983 |
| JP | 61017011 A | 1/1986 |
| JP | 05223526 | 8/1993 |
| JP | 07229733 | 8/1995 |
| JP | 2004023632 A | 1/2004 |
| WO | 0206765 A1 | 1/2002 |
| WO | 02084215 A1 | 10/2002 |
| WO | WO 03014655 A1 * | 2/2003 |
| WO | 03076871 A2 | 9/2003 |
| WO | 03078924 A2 | 9/2003 |
| WO | 2004055475 A2 | 7/2004 |

OTHER PUBLICATIONS

Japanese Office Action dated Dec. 4, 2012, corresponding to Japanese Patent Application No. 2012-055740; English language translation.

Search Report dated Apr. 5, 2013, issued by the European Patent Office for European Patent Application 10 165 895.4.

Search Report dated Apr. 4, 2013, issued by the European Patent Office for European Patent Application 10 185 239.0.

Search Report dated Apr. 3, 2013, issued by the European Patent Office for European Patent Application 10 185 234.1.

Search Report dated Apr. 2, 2013, issued by the European Patent Office for European Patent Application 10 185 231.7.

* cited by examiner

COORDINATE MEASURING DEVICE AND METHOD FOR MEASURING WITH A COORDINATE MEASURING DEVICE

This application is a continuation of U.S. application Ser. No. 11/721,854, filed on Sep. 25, 2009, now abandoned, which is a 371 of PCT/EP2005/013526 filed on Dec. 16, 2005, which claims priority to German application number 10 2004 61151.3, filed on Dec. 16, 2004.

BACKGROUND OF THE INVENTION

1. Field of the Invention

The invention concerns a coordinate measuring apparatus for measuring workpiece geometries with movable traverse axes and having one or several sensors for recording measuring points on the workpiece surfaces. The invention also concerns a process for measuring workpiece geometries with a coordinate measuring apparatus with movable transverse axes and having one or several sensors for recording measuring points on the workpiece surfaces.

2. Description of Related Art

Coordinate measuring apparatus are understood to be measuring apparatus having one or several mechanically movable axes for measuring geometric properties of workpieces or measuring objects. These coordinate measuring apparatus are equipped with sensors for recording geometric measuring points on the workpiece surfaces. The prior art encompasses predominantly coordinate measuring apparatus with purely tactile sensors, that is, the measuring point is generated by contact of the workpiece surface with a tactile sensor. Coordinate measuring apparatus with optical sensors are also known, in which the measuring points are determined by means of optoelectronic image processing or a laser proximity sensor. Coordinate measuring apparatus are also known in which some of these sensors are mutually combined, thus providing expanded options for the user.

An overview of coordinate measuring technology is provided in the publications DE.Z.: The Library of Technology, Coordinate Measuring Technology in Industrial Application, Modern Industry Publishers, Volume 203 (ISBN 3-478-93212-2) and DE.Z.: The Library of Technology, Multisensor Coordinate Measuring Technology, Modern Industry Publishers, Volume 248 (ISBN 3-478-93290-4).

The circumstance is repeatedly encountered in which the customarily used coordinate measuring apparatus is not optimally configured for the respective measuring task, so that as a consequence several apparatus of different designs are required.

It is the object of the invention to further develop a coordinate measuring apparatus as well as a process for measuring workpiece geometries with a coordinate measuring apparatus in such a way that an optimal configuration for the respective measuring task is ensured, so that basically several apparatus of different design are required.

The object is attained according to the invention by equipping a coordinate measuring apparatus with all the sensors required for attaining the measuring object. These can be selectively installed or uninstalled or automatically exchanged during operation via corresponding sensor exchange systems. With this, a flexible measurement of complex workpiece geometries is possible. It is, of course, likewise possible to install a corresponding number of selected sensors on the apparatus and to measure the workpieces with this configuration.

A coordinate measuring apparatus for measuring workpiece geometries with movable transverse axes and having one or several sensors for recording the measuring points on the workpiece surfaces is proposed, wherein an image processing sensor and/or a switching scanning system and/or a measuring scanning system and/or a laser proximity sensor integrated into the image processing sensor and/or a separate laser proximity sensor and/or a white light interferometer and/or a tactile/optical sensing device, in which the position of the molded scanning element is directly determined by means of an image processing sensor, and/or a punctiform working interferometer sensor and/or a punctiform working interferometer sensor with an integrated rotational axis and/or a punctiform working interferometer sensor with a bent viewing direction, and/or an X-ray sensor and/or a chromatic focus sensor and/or a confocal scanning measuring head is installed as the sensor. Herein, the type or number of sensors used is designed for each respective measuring task.

Accordingly, a process for measuring workpiece geometries with a coordinate measuring apparatus with movable transverse axes and having one or several sensors for recording measuring points on the workpiece surface is characterized in that an image processing sensor and/or a switching scanning system and/or a measuring scanning system and/or a laser proximity sensor integrated in the image processing sensor and/or a separate laser proximity sensor and/or a white light interferometer and/or a tactile/optical sensing device, in which the position of the molded scanning element is directly determined by means of an image processing sensor, and/or a punctiform working interferometer sensor and/or a punctiform working interferometer sensor with an integrated rotational axis and/or a punctiform working interferometer sensor with an angular viewing direction, and/or an X-ray sensor and/or a chromatic focus sensor and/or a confocal scanning measuring head is installed as the sensor, wherein the type or number of sensors used can be selected in accordance with the respective measuring task.

Further detail problems occur with the design of such a coordinate measuring apparatus, which are beyond the above-described basic object. These will be described in the following, and solutions for solving these problems will be disclosed.

When applying image processing sensors in coordinate measuring apparatus, it is necessary for the user to set different magnifications. This is contradicted by the requirement of optical systems having optimized costs as well as high imaging quality, which are very difficult to achieve with the otherwise required zoom optic. This can be solved, however, on the basis of an idea of the invention, which will be further developed independently, by selecting a camera for the imaging processing sensor that has a greater resolution (pixel number) than the resolution of the monitor used or the monitor section used for the image representation. The camera can also be equipped with optional access to specific sections of the overall image. It is then possible to represent only one section of the overall image in the live image or observed image of the coordinate measuring apparatus, which is enlarged to the format of the respective display window or monitor. As a result, the user is provided with the possibility of selecting zoomed-in sections of the image according to his/her own ideas. The magnification between the measured object and the monitor image can be controlled by changing the selected section of the camera image by means of the software or displaying the live image in the same way. This can also be operated if required by means of a rotary knob, which is integrated into the control system of the coordinate measuring apparatus, or via a software controller. It is also possible to display the image or the image section only with a low resolution when a high resolution camera is used, but using the full resolution of the camera for digital image processing in the background in order to increase the accuracy. The actual optical magnification of the image optic of the image processing is herein relatively low (typically one time, at the most however 5 times), and the optical effect of a higher resolution is achieved by merely representing a section of the high resolution camera image on the low resolution monitor.

An enhancement of the above-described mode of operation consists in integrating several, but at least two, cameras via minor systems in an optical beam path and utilizing the same imaging objective. A laser proximity sensor can be integrated, in addition, and the same imaging objective can likewise be utilized. It is possible in this way to realize different magnifications for the user by selecting different interfaces or different cameras with different chip sizes and the same pixel number or with different pixel numbers and the same chip size, or both. It is likewise possible to additionally integrate herein a laser proximity sensor in the beam path, which also utilizes the same imaging objective via mirror systems. If the magnification ranges achieved by selecting different camera chips are still not sufficient, it is moreover possible to integrate for each camera a corresponding additional magnification or additional reduction as an optical component in the camera beam path.

In order to prevent different illumination intensities from occurring in different cameras with a uniform illumination of the measuring objective, which lead to difficulties in the image evaluation, the optical splitters (for example, a minor), which split the beam paths for the different cameras, are configured in such a way that all cameras receive the same proportionate light intensity. This is achieved by selecting corresponding degrees of reflection or transmission for the optical splitters that are used, especially beam splitters. In addition, this system can likewise be expanded by means of an integrated bright field incident light beam path. This bright field incident light beam path is likewise realized via a correspondingly dimensioned optical splitter, such as a beam splitter.

A particular problem consists in that the selected display resolution is not an integral multiple or an integral divider of the selected image recording resolution. An adaptation of resolution, one to the other, can be carried out by resampling from the image taken with a high resolution camera. A required number of image points corresponding to the resolution of the evaluation or display range are calculated.

Another problem in the use of known coordinate measuring apparatus consists in the fact that once the programs for measuring workpieces have been created, they will then be subsequently modified, or subsequent features from the already obtained measuring results will be generated. This is not possible in accordance with the current state of the art, since the accordingly corresponding technology data are no longer available. The problem is solved by the invention by recording and storing the measuring points or video images or X-ray images measured with one or several sensors of the coordinate measuring apparatus as well as their corresponding positions and other technology parameters, such as the default value of the utilized illumination systems, light intensity, et cetera of the coordinate measuring apparatus during the measuring sequence, and making these available for a subsequent evaluation. Similarly to this described mode of operation, it is also possible to separately measure several partial images of a measuring object with the image processing sensor and to join these to form an overall image of the overall measuring object or an overall image consisting of the partial sections of the overall measuring object. This image can be stored and later evaluated at a separate workstation.

For this purpose, the calibration parameters of the coordinate measuring apparatus used for recording the image are likewise stored and newly utilized with the evaluation software. An offline raster scanning is made possible.

In a modification of the above-described mode of operation, it is likewise possible to store the entire measuring sequence, including the operating position of the coordinate measuring apparatus and/or the images of the image processing sensor and/or the images of the X-ray sensor and/or the scanning points of the tactile sensor and/or the scanning points of the laser sensor and/or further technology parameters, and thus make these available for a subsequent evaluation. During the subsequent evaluation, new measuring results can be generated from the available measuring points and technology parameters, and these can also be checked directly at the measuring apparatus by including the measuring apparatus, and the actual measuring programs for the application on further measuring objectives can also be optimized and modified.

It is provided that when using an image processing sensor for the case in which the visual field of the camera is insufficient to record at one time a defined area of the measuring object by selecting the desired evaluation range (image processing window), the image can be formed from several partial images and then shown to the user as a measured image that is mad available for evaluation.

A frequently occurring problem consists in the fact that these apparatus must frequently be operated by inexperienced operators. In the ideal case, the measuring objects should be simply placed on the coordinate measuring apparatus and the start button should be pushed. The problem consists in that the coordinate measuring apparatus must first be shown where the actual measuring object is located, in order to able to implement the CNC program within the workpiece coordinates of the coordinate measuring apparatus. As an independent invention, the following process is proposed: After placing the workpiece on the coordinate measuring apparatus, a search for the measuring objective within the measuring area of the coordinate measuring apparatus is carried out by driving a sensor, especially an image processing sensor, over a straight-line, spiral-shaped, meander-shaped, circular shaped, stochastic or otherwise shaped search path, until the existence of a measuring object is detected.

A scanning of the outer contour is carried out in a second process step, starting at the starting point generated by the detection of the measuring object (contour tracking for the detection of the outer geometry and position of the measuring object).

In a third process step, the recording of the measuring points located within this outer contour is optionally performed using one of the selectively available sensors of the coordinate measuring apparatus, for example, by rastering with the image processing sensor or scanning with the tactile sensor. The measuring points obtained in this way can then be forwarded for further evaluation in accordance with the testing plan. It is also possible to subsequently measure canonical geometric elements within the known workpiece position, or to simply utilize the first measured contour points to align the workpiece in the workpiece coordinates and then measure canonical geometric elements and features, such as angles and distances.

A further problem when using coordinate measuring apparatus, especially in those with image processing sensors, consists in the fact that the different illumination sources have non-linear characteristics, that is, the default value of the illumination intensity indicated on the computer software is not connected with a linear interrelationship with the actual illumination intensity of the illumination system. This leads to the fact, among other things, that different measuring objects cannot be correctly measured or programs cannot be transferred form one apparatus to the other without difficulty. In order to solve this problem, it is proposed according to the invention to record the characteristics of the illumination devices of the image processing sensor system of the coordinate measuring apparatus, that is, recording the dependency of the illumination intensity on the default values of the operator interface of the measuring device by measuring the intensity at the corresponding default value with the image processing sensors. The corresponding measuring results are stored as characteristic results in the computer of the measuring apparatus. As an alternative, it is also possible to store these measured values in a so-called light box, which carries out the control of the illumination intensity during the operation of the coordinate measuring apparatus. If this light characteristic measurement is carried out on a calibrated reference object or at least for several apparatus on a standard calibration object, it becomes possible in this way to balance the apparatus in their behavior toward the outside, that is, in their behavior with reference to the dependency between the default light value and the physical illumination value, and thus to ensure the program transferability of different apparatus. In order to facilitate the operation of the apparatus, it is practical to correct the characteristic in such a way that a linearity is preexistent for the operator, that is, the previously measured characteristic is taken into consideration in such a way for the correction calculation during the operation of the coordinate measuring apparatus that it appears that a linear characteristic is available for the operator, that is, the default value and the illumination intensity then follow a linear interrelation. The increase of this linear characteristic can then be balanced for several apparatus by means of a simple correction factor.

Based on the above-described linearization of the illumination device characteristics in the coordinate measuring apparatus, it is possible to solve the problem that measuring objects of different brightness cannot be measured without problems with the same illumination setting, since the illumination of the measuring object is not correctly provided. This is attained in accordance with the invention by carrying out the following process steps:

While implementing automatic programs for measuring parts with different reflection intensities, the default values predetermined in the program are first adjusted for the illumination intensities of the different illumination sources. In a second step, the illumination intensity, which is influenced by the reflection behavior of the workpiece, is tested using the image processing sensor, and it is monitored whether the measured value corresponds to the stored desired value or default value. If the deviation between desired and actual value exceeds a fixed threshold value, the default value of the illumination intensity is linearly corrected and newly adjusted according to the previously recorded light characteristic of the illumination system. The result of this is that the desired light intensity, as stored in the program, is reflected by the measuring object. The desired object feature is then measured. This procedure is repeated according to the number of image sections that the coordinate measuring apparatus requires for solving the measurement task. The advantage of this mode of operation as compared with conventional light control systems is that only two images of the measuring object must be recorded in this control process, thus a very fast light control can be realized.

According to the above-described mode of operation, it is likewise possible to store several characteristic sets for the coordinate measuring apparatus, which correspond to the behavior of further similar coordinate measuring apparatus, but with different light characteristics. Measuring programs of older or foreign manufacturers can thus also be utilized.

With coordinate measuring apparatus, it is possible to scan contours of workpiece surfaces. This can be realized with one sensor or with the combined operation of several sensors. If an evaluation of the contours is carried out by comparing these with desired contours from, for example, CAD files, it is necessary to internally superimpose desired and actual computers in order to realize a graphic comparison. This cannot be accomplished by means of a simple offset of the relative position or a rotation of the relative position especially with flexible or elastic parts, since the parts are elastically deformed. This problem is solved by proceeding according to the method having an inventive content, which is described in the following. With the best adaptation between desired and actual contour, aside from the relative position change between the desired and actual contour per se, the length of the contour sections corresponding to the desired length is also modified, while maintaining the curvature, or alternatively, the contour curvature is modified, while maintaining the contour length at the actual contour, in such a way that an optimal coverage is achieved with the desired contour. If the parts having distinguished geometric features are difficult to test due to their elasticity or deformation, this procedure can be reinforced by carrying out the adaptation between the actual and desired contours on a group of actual and desired contours to individually distinguished features, such as the intersection points of contours or circular structures or other recurring structures, thus generating a distortion of the actual contour for an optimal coverage with the desired contour. This is also possible in a similar way with cylindrical parts, in which the contours measured on the cylinder surface are partially rotated or screwed on the cylinder jacket surface in order to produce an optimal coverage between desired and actual contours. This mode of operation is suitable in particular for measuring the customary stents used in medicine. The above-described method is also possible in a similar reversed mode of operation, that is, an adaptation of the desired to the actual geometry.

In order to achieve a metrologically suitable evaluation of the desired to actual comparison, it is practical to optimize the adaptation not toward a minimization of the deviation between the desired and actual contour, but toward a minimization of the tolerance zone utilization. In practice, however, the tolerances for the measurement of the parts are generally predetermined as measurement, shape and/or position tolerances in the form of printed drawings or CAD drawings. The conversion of these tolerances into corresponding tolerance zones is to be achieved by means of the coordinate measuring apparatus. This object is attained according to the invention by storing algorithms in the coordinate measuring apparatus, which implement an automatic conversion of the measurement, shape and/or position tolerances into tolerance zones related to the contour sections. In the simplest case, one standard overall tolerance of the contour section is obtained for several tolerances. For more complicated tolerances, however, it is also possible that this may not be realizable. In this case, a multiple evaluation is automatically carried out for the different tolerance situations in the coordinate measuring apparatus. For this purpose, several tolerance zones are assigned to each desired or actual contour segment. Automatic successive evaluations are then performed on several desired or actual contour areas combined in groups and/or the desired and actual contours of the complete workpiece for respectively several different position, measurement and/or shape tolerance situations. As an option, the unfavorable result of the different desired to actual comparisons can be displayed at the end of the evaluation for each desired or actual contour segment with the aid of the different tolerance zones.

It is frequently the problem when an image processing with autofocusing sensors is used that the height of partially transparent layers is to be measured. In order to solve this problem, it is proposed according to the invention to simultaneously generate autofocus points on several semi-transparent layers for several evaluation ranges with the image processing sensor in autofocus mode. This is realized by moving the image processing sensor in the measuring direction while at the same time recording several images. The focus measuring points are calculated according to a contrast criterion within the respectively fixed evaluation ranges.

When using coordinate measuring apparatus in connection with a laser proximity sensor, it is customary to scan contours on workpiece surfaces in a sensor measuring direction, that is, the coordinate measuring apparatus is moved over a predetermined path in a direction that is different from the sensor measuring direction. Under the control of the sensor, the coordinate measuring apparatus is guided in the measuring direction of the sensor within the remaining axis. In practice there is also the task of measuring, for example, a sphere having predefined contour lines. This is not possible using the above-described mode of operation. In order to solve this problem, the invention provides that the position control of the sensor or the position control circuit of the coordinate measuring apparatus is controlled in such a way, in dependence upon the deflection display of the laser proximity sensor, that the deflection of the laser proximity sensor remains constant. The axes of the coordinate measuring apparatus are moved herein perpendicular or nearly perpendicular to the measuring direction of the laser proximity sensor. According to the marginal condition, it is taken into consideration that the measuring points of the laser proximity sensor are located within a predefined section plane. It is thus possible to scan contour lines on the measuring object. The laser proximity sensor is moved over a path in which the distance between sensor and object is equal.

A further problem when using coordinate measuring apparatus consists in the fact that the measuring objects must be measured from different sides. If, however, the position of the measuring object is changed within the coordinate measuring apparatus, the reference of the measuring points between each other is lost, and a mutual evaluation of the measuring points is no longer possible. This problem is solved according to the invention by directly applying either reference features of the measuring object itself or additionally applied reference features (preferably spheres) on the measuring object or on a measuring object supporting frame. The mode of operation for measuring with the coordinate measuring apparatus is as follows:

1. Measuring the position of one or several, preferably three reference marks, in particular spheres, on the measuring object or fixedly allocated thereon;
2. Storing the position in the computer of the coordinate measuring apparatus;
3. Measuring any desired points on the measuring object, which are accessible by means of one or several sensors;
4. Changing the position of the measuring object within the measuring volume of the coordinate measuring apparatus manually or by means of an integrated rotational axis or rotational pivoting axis;
5. Again measuring the reference marks;
6. Internally balancing the respective reference marks so that a minimized offset is present between them in the software;
7. Measuring further points on the measuring object with one or several sensors of the coordinate measuring apparatus;
8. Repeating the above-mentioned procedures any number of times;
9. Jointly evaluating all the measuring points of the measuring object within a coordinate system recorded during the above-described measuring cycle.

The advantage of this mode of operation is that the accuracy of the rotary pivoting axis used for the rotation or rotary pivoting of the measuring object is not suggested in the measuring result. The measured position values of the rotary axis or rotary pivoting axis can of course also be utilized for the evaluation. It is likewise possible to measure the reference marks (preferably spheres) with a sensor and to accordingly carry out the measurement on the workpiece with a corresponding other one.

Coordinate measuring apparatus with different sensors also selectively have, among other things, sensors with an optotactile sensing device. Therein, the determination of the position of the molded scanning element (sphere, cylinder) is carried out by means of an image processing sensor (WO-A-98/157121). A problem is presented by the need to adjust this sensor to the position of the scanning sphere. This is realized according to the invention by additionally arranging an adjustment unit, which makes possible a relative adjustment between the molded scanning element (scanning sphere including scanning pin and holder) and the image processing sensor, on the coordinate axis that carries the sensor. For example, an automatic focusing of the molded scanning element is then possible in relation to the image processing sensor via an autofocusing process.

If highly accurate measurements are carried out with tactile sensors, the problem can occur that the geometric quality of the molded scanning element (sphere, cylinder or the like) is worse than the required measurement inaccuracy. This leads to unusable measuring results. In order to solve this problem, the invention proposes to measure the geometry of the molded scanning element (for example, sphere, cylinder) in advance at an external measuring location and to automatically take these measured values into consideration as correction values when using the molded scanning element in the coordinate measuring apparatus. As an alternative, it is possible to record the deviation of the actual geometry itself from the ideal desired geometry of the molded scanning element by means of measurements in the utilized coordinate measuring apparatus on a highly accurate calibrated measurement standard (such as a calibration sphere).

An important option for coordinate measuring apparatus is the possibility of exchanging different sensors or scanning pins or optical attachments, among other things. An exchange device can be provided for this purpose according to the invention. In order to prevent a limitation of the measuring volume of the coordinate measuring apparatus due to the placement of the exchange device, it is provided according to the invention to arrange this exchange device on a separate adjustment axis, which drives the exchange device out of the measuring volume when no exchange cycle is planned, and drives the exchange device into the measuring volume when an exchange cycle is planned. This adjustment axis can be configured with a spindle drive. As an alternative, it is possible to work with only 2 stops, against which it is positioned by means of a motor drive. As an alternative, it is possible to determine the 2 positions by means of a linear path measuring system or a speed sensor on the spindle drive.

Coordinate measuring apparatus are generally exposed to different working temperatures at the place where they are installed. If several sensors are mounted on the coordinate measuring apparatus, this leads to thermally induced changes in the positions between the different sensors. This leads to measurement errors. In order to solve this problem, it is proposed according to the invention to measure the temperature of the mechanical components that serve for mounting the different sensors at one or several locations, in order to compensate for defective actions due to temperature fluctuations at the location of installation of the coordinate measuring apparatus, and to take into consideration the expansion of the corresponding mechanical components when calculating the measuring points that are recorded by the different sensors. This means that, for example, when using a sensing device in an image processing sensor, the temperature of the component that connects the two sensors is permanently measured, linked to the linear expansion coefficients of the material utilized for this component, and thus the corrected relative position of the sensor in the coordinate system of the coordinate measuring apparatus is calculated. These corrected values are included in each measurement of measuring points. The above-described temperature compensation is carried out in a typical embodiment by means of a linear multiplication of the measured values by a constant factor, which is influenced by the temperature.

In order to be able to measure a measuring object from several sides during the measuring procedure on a coordinate measuring apparatus, it is practical to clamp the measuring object in a rotational axis and thus rotate it into an optimal position for measurement with the different sensors. In addition to holding the measuring object with the rotational axis, it is also possible to use a corresponding countertip. When the measuring objects are clamped between tips, however, the problem arises that the tensile force of the countertip can lead to deformations of the measuring object. In order to preclude the errors caused by this, it is proposed according to the invention to constantly deform the measuring object or to automatically position the countertip on the measuring object until a predefined force is reached. In this way, the countertip is elastically mounted, so that the correspondingly required force can be determined via a deflection and a corresponding end switch.

A further problem with regard to the use of coordinate measuring apparatus consists in that frequently several contours are to be measured closely together. With the required number, this leads to considerably long measuring times. This problem is solved according to the invention by arranging several tactile sensors of the same kind and different design closely together on a mutual mechanical axis of the coordinate measuring apparatus. It is likewise possible to arrange several of the mentioned sensors on a rotary pivoting unit. With the tactile sensors arranged in this way, the contours of the workpiece surfaces can be simultaneously recorded during the scanning operation. An extensive measurement is carried out in this way. An embodiment variation results according to the invention, which uses only one of the several arranged sensing devices for realizing the scanning operation of the coordinate measuring apparatus (control of the positioning process of the coordinate measuring apparatus based upon the deflection of the sensing device), and operates the other sensing devices merely to (passively) record measured values. These do not contribute to the control of the coordinate measuring apparatus. The control of an optional rotary pivoting unit for the multisensor arrangement can be automatically carried out by means of the difference between the average deflections of the different individual sensing devices. Typical application cases for the mentioned multisensor arrangement are the measurement of tooth flanks, toothed wheels, or the measurement of the shape of cams of camshafts. Several measuring tracks are simultaneously generated during one measuring procedure according to the invention.

When the measurement is carried out with an image processing sensor on the outer edges of workpieces, in particular of rotationally symmetrical cutting tools or cutting plates, there is always the problem that the image processing sensor has to be permanently refocused on the outer edge to be measured. This problem can be solved according to the invention by additionally integrating a laser proximity sensor in the image processing beam path. The laser sensor measures the distance from the image processing sensor to the workpiece surface in the vicinity of the outer edge to be measured, and is connected in such a way to a position control circuit of the coordinate measuring apparatus that an automatic tracking takes place. The image processing sensors are thus permanently focused. The tracking of the workpiece for the focusing operation can alternatively be realized with the Cartesian axes of the coordinate measuring apparatus or also by means of an optional rotational axis (rotation of the workpiece to be measured).

When using image processing sensors in coordinate measuring apparatus, one problem consists in the fact that the number of evaluated images is not sufficient for the required number of measuring points or the total measuring time cannot be sufficiently realized for the requirements. In the state of the art, the camera of the image processing system of the coordinate measuring apparatus is operated in video standard (50 to 60 Hz) and stores and evaluates an image in loose order predetermined by the operator or by means of the program sequence of the coordinate measuring apparatus. In this way, the number of evaluated images is clearly smaller than the number recorded by the camera. As a result, the measuring time is not optimal or the measuring point number is insufficient. In order to solve this problem, it was proposed according to the invention to carry out the evaluation of the image for each image taken by the camera. This means that the evaluation is realized in real time video. In other words, during the time in which the image is being taken by the camera of the image processing system, the calculation of the image evaluation of the previous image is being carried out parallel with and at the same time that the image is being taken by the camera of the image processing system. This procedure is continuously repeated until the entire measuring process has ended. The image evaluation of the image processing sensor is thus carried out in real time video, that is, in the same frequency as the image repeat frequency of the camera. Based on this mode of operation, it is possible to rotate the measuring object with a rotational axis during measurement, and to record and evaluate the latter with the frequency of the camera measuring point on the outer edge of the measuring object for the realization of roundness measurement in real time video.

It is also possible according to the invention to extend the integration time in order to improve the signal to noise ratio of the image processing sensors or X-ray sensors until a sufficiently low signal to noise ratio is available. This means that several successive images are added and the image evaluation is carried out on this added image. This procedure can be automatically controlled by extending the integration time of such a camera until a sufficiently good image can be stored and further processed. The intensity of the image points is herein monitored up to a desired value and enlarged by storing several images.

In the coordinate measuring apparatus according to the invention image processing sensors with laser sensors integrated within the beam path can be used. These beam paths can also be configured as zoom optics. In a further embodiment, the working distance of the zoom optic used can also be adjusted. In the systems used in practice, it is to be expected that the desired optical properties of the integrated laser proximity sensor and the image processing sensor are not available with the same adjustment parameters (working distance/magnification). According to the invention, the aperture and working distance of the zoom optic systems used can be alternatively optimized for the laser sensor or the image processing sensor. This additional optical system can be configured in such a way that the same adjustment parameters (working distance/magnification) are not available for the laser sensor and the image processing sensor. The aperture and working distance of the zoom optic system used can be optimized as an alternative for the laser sensor or the image processing sensor by means of an additional exchangeable optical attachment. This additional optical system can be configured in such a way that it creates optimized conditions for the laser sensor. It is possible to connect this attachment via a magnetic interface to the zoom optic and/or to exchange it via a sensing device exchange station that is otherwise used for tactile sensors.

Different illumination sources, such as bright field, dark field, and dark light, are used when the measurement is carried out with image processing sensors in coordinate measuring apparatus in order to achieve respectively optimal contrast conditions for partial areas of a workpiece to be measured. These illumination sources are varied with regard to their settings, such as intensity, solid angle of the illumination (illumination angle or direction of illumination), or illumination direction, in order to achieve optimal conditions. These parameters are different for partial areas of the object to be measured, which is why it is not possible to optically reproduce the entire object with one illumination setting. In order to preclude this disadvantage, it is proposed according to the invention to record several images, one after the other, using different illumination sources, in order to generate an optimally contrasted image, and to remove from each image the areas with optimal contrast and join these to form a geometrically correct overall image. In detail, it is thus possible to record different images of the same object or object section by using different illumination directions of a dark field illumination and/or different illumination angles of a dark field illumination and/or by using a bright field illumination, and to join the optimally contrasted areas of the individual image to form an overall image. This can then be metrologically evaluated. The described mode of operation can be likewise applied to each individual pixel of the image processing sensor, that is, the pixel with optimal contrast is selected from among the number of individual images for each pixel of the resulting overall image. The contrast of a single pixel is determined by means of the amplitude difference of this pixel with regard to its neighbor in the image.

If the surface contour of workpieces is measured with an autofocusing sensor, the measuring points are usually predetermined by the operator in the teach-in mode. If unknown contours are to be measured in this process, this is only possible with difficulty. This is improved according to the invention by carrying out a scanning procedure on the material surface with an autofocusing sensor in such a way that the expected location of the next measuring point is theoretically calculated from the already measured focus points by interpolation, and can be exactly verified by means of a new autofocus point. If this procedure is repeated several times in succession, a fully automatic scanning is achieved. The number of points to be scanned along one line as well as an area to be scanned on the workpiece or measuring object can be predetermined by the operator. The extrapolation of the next measuring point from the two or more preceding measuring points can be carried out by means of a linear extrapolation. It is further possible to perform this extrapolation via polynomial interpolation of the latest measured two or more points.

If several delimited areas of the image are utilized to determine the focus points during each focusing procedure, a sequence of measuring points can thus be generated during one focusing procedure. If these sequences are placed one after the other, a scanning of complete contours is likewise realized.

When image processing sensors or X-ray tomography sensors are used, the problem arises that areas with strong as well as weak intensities are present within an image, depending on the properties of the measuring object. This is caused by the different reflection or transmission properties of the materials. As a result, only low signals, with the consequent bad signal to noise ratio, are present for the "dark" image areas. However, a stronger illumination or irradiation of the object would lead to an outshining in the brighter areas and should thus be excluded.

SUMMARY OF THE INVENTION

The described problem is solved according to the invention by recording several images with different illumination intensities for each image section. In addition, these images of the same object area are joined to form a new overall image in such a way that the image point amplitudes are standardized to the respectively used illumination or irradiation intensity. In joining the overall image, the pixels of the respective image, which are located outside of the allowed dynamic range (for example, 0-245 at 8 Bit), are also used. Amplitudes with overshining from the respective image are not taken into consideration. An averaging of the values is carried out for pixels with several valid image point amplitudes. The overall image can then be evaluated.

When image processing sensors as well as X-ray tomography applications are used, the radiation intensity or radiographic intensity of the measuring object is frequently insufficient to enable an optimal measurement. This can be improved according to the invention by recording several images of an object area with respectively different illumination or irradiation intensities in order to optimize the quality of the images recorded with image processing sensors or X-ray tomography sensors, and then joining these to form an overall image. For example, the image amplitudes (pixels) that are located within a defined valid amplitude range (typically between 0 and 245 LSB) of each individual image of an individual image group recorded with respectively different illumination or irradiation intensity are utilized. Image point amplitudes with amplitude values that are indicative of an overshining (for example, >245 LSB) remain unconsidered in the evaluation. If valid image amplitudes from several images are available for one image point, an average value can be formed from the standardized image point amplitudes. It is possible to carry out all the described calculations on the amplitude values standardized to the irradiation or illumination intensity that is used.

Further details, advantages and features of the invention are obtained not only from the claims and the features disclosed therein, per se and/or in combination, but also from the following description of preferred exemplary embodiments depicted in the drawings.

DETAILED DESCRIPTION OF THE INVENTION

The invention or invention complexes will be described in further detail below with reference to preferred exemplary embodiments.

The corresponding descriptions are presented herein based on the presumed knowledge of coordinate measuring technology. Reference is made in addition to the publications DE.Z.: The Library of Technology, Coordinate Measuring Technology in Industrial Application, Modern Industry Publishers, Volume 203 (ISBN 3-478-93212-2) and DE.Z.: The Library of Technology, Multisensor Coordinate Measuring Technology, Modern Industry Publishers, Volume 248 (ISBN 3-478-93290-4), to which express reference is made and whose content is incorporated into the description as part of the specification.

Figure 1:
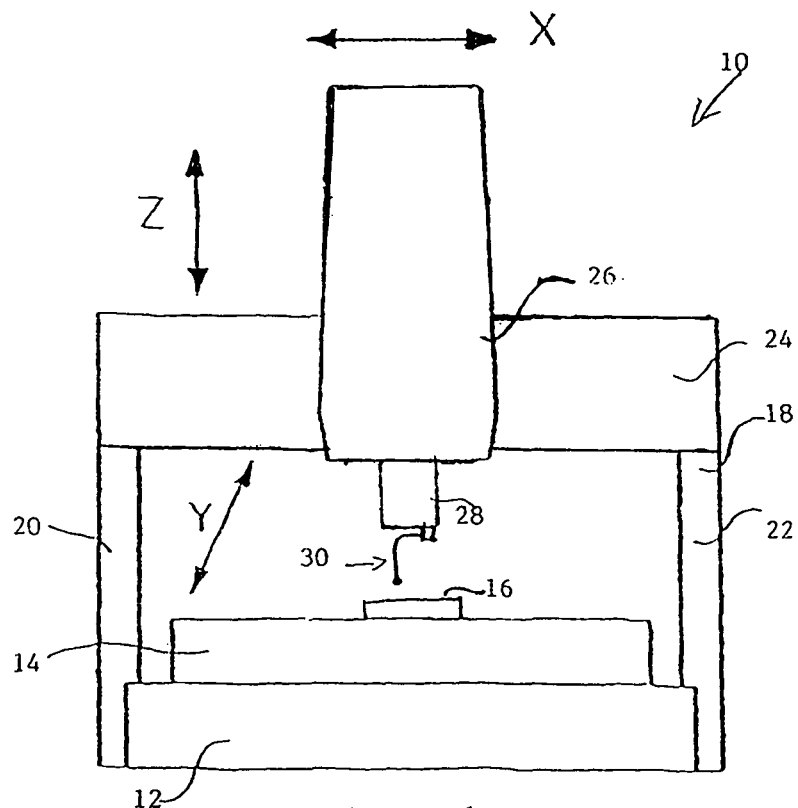
FIG. 1 shows a schematic diagram of a coordinate measuring apparatus.

In FIG. 1, a coordinate measuring apparatus 10, which is equipped with the sensor or sensors required for the respective solution of a measuring task, is represented purely schematically. The sensors can be selectively installed or uninstalled or automatically exchanged via corresponding sensor exchange systems, even during operation. In this way, a flexible measuring of complex workpiece geometries is enabled. The scope of the invention is not abandoned, of course, when a corresponding number of selected sensors are allowed to be fixedly mounted on the apparatus in order to measure objects in this configuration.

The principle of a coordinate measuring apparatus 10, which is sufficiently known and is depicted again in FIG. 1, comprises a basic frame 12 made, for example, of granite, with a measuring table 14, on which an object 16 to be measured is positioned in order to measure its surface properties.

Along the basic frame 12, a portal 18 can be displaced in the Y-direction. For this purpose, columns or bases 20, 22 are slidingly supported on the basic frame 12. Extending outward from the columns 20, 22 is a traverse 24, along which a carriage can be moved, which in turn accommodates a central sleeve or column 26, which can be displaced in the Z direction. Extending from the central sleeve 26, or if necessary an exchange interface 28, is a sensor 30, which is configured in the exemplary embodiment as a tactile sensor, and which carries out measurements as a tactile/optical sensor when the central sleeve 26 includes an image processing sensor. Reference is made herein to already known techniques, as well as likewise to sensors used for this purpose, such as laser proximity sensors, white light interferometers, image processing sensors, X-ray sensors, or chromatic focus sensors or confocal scanning measuring heads, without thereby limiting the teaching of the invention in any way. The sensor or sensors are selected and used according to the measuring task in order to optimally configure the coordinate measuring apparatus 10 for the respective measuring task. The problems that occur with the conventional coordinate measuring apparatus are solved at the same time.

Figure 2:
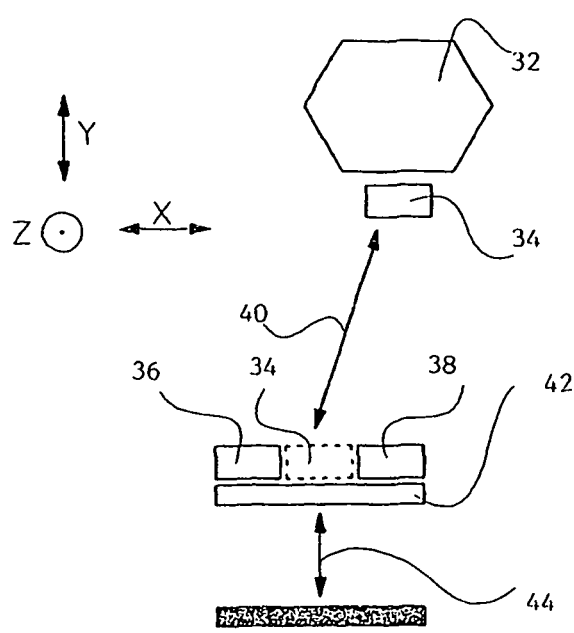
FIG. 2 shows a schematic diagram of a section of a coordinate measuring apparatus.

In order to be able to utilize the coordinate measuring apparatus 10 with the suitable sensor, the coordinate measuring apparatus can have a sensor exchanger, the principle of which can be seen in the diagram of FIG. 2. In this way, several sensors can be selectively provided with the coordinate measuring apparatus via an exchange interface and can be exchanged manually or by means of an automatic removal of the coordinate measuring apparatus to a parking station.

FIG. 2 shows a plan view of a section of a coordinate measuring apparatus with a central sleeve 32. The sensors that can be connected to the central sleeve are identified with the reference numerals 34, 36, 38. The sensors 34, 36, 38 can act therein as optical or tactile sensors, just to name exemplary sensor types. The coordinate measuring apparatus, that is, the central sleeve 32, can be displaced in the Y-X-Z direction in order to allow the exchange of the sensors 34, 36, 38. In the exemplary embodiment, the central sleeve 32, and thus the coordinate measuring apparatus, positions the sensor 34 in a parking station 42 located on a positioning path 40, and is thus able to pick up one of the sensors 36, 38 deposited in the parking station 42 and attach it again to the central sleeve 32. The parking station 42 or the sensing device exchange system can be displaced by means of an adjustment axis 44 in such a way that the sensing device exchanger 42 is arranged outside of the measuring volume of the coordinate measuring apparatus when it is not in operation.

When utilizing image processing sensors in coordinate measuring apparatus, it is necessary for the user to set different magnifications. This is contradicted by the requirement for a cost optimization of the optical systems as well as a high image quality, which are difficult to achieve with the otherwise required zoom optics. In order to sufficiently fulfill these requirements, the camera for the image processing sensor is selected with a higher resolution (pixel number) than the resolution of the monitor used or the monitor section used for the image presentation. The camera can additionally be equipped with an optional access to specific sections of the overall image. It is then possible to represent only one section of the overall image in the live image or observed image of the coordinate measuring apparatus, which is magnified to the format of the respective display window or monitor. As a result, the user has the possibility of selecting zoomed sections of the image according to his/her own ideas. The magnification between the measuring object and the monitor image can be controlled by changing the selected section of the camera image by means of the software or by representing the live image in the same way. The magnification between the measuring object and the monitor image can be changed by changing the selected section of the camera image. This can be operated if required by means of a rotary knob, which is integrated into the control system of the coordinate measuring apparatus, or via a software controller. It is further possible that when using a high resolution camera the image or the image section is displayed only with the lower resolution of the monitor, but the full resolution of the camera is used in the background to process the digital image in order to increase the accuracy. The actual optical magnification of the imaging optic of the image processing is relatively low in this (typically 1 time, but at the most 5 times), and the optical effect of a higher magnification is achieved by displaying only a section of the high resolution camera image on the lower resolution monitor.

The previously described process will be explained in principle with reference to FIG. 3. A section of a coordinate measuring apparatus is arranged in FIG. 3. The object 16 to be measured is thus represented on the measuring table 12. Arranged above the measuring object 16 are an imaging objective 46 and a camera, such as a CCD camera 48, which is connected to a monitor 52 via a computer 50. By means of the hardware of the computer or computers 50, it is possible to mathematically adapt the resolution between the camera 48 and the monitor 52 in order to utilize, for example, a greater camera resolution than can be reproduced by the monitor 52. It is herein also possible to intervene with an optional access of specific sections of the overall image or to show the live or observed image of the coordinate measuring apparatus only as a section of the overall image enlarged to the format of the display window. By selecting different sections of the recorded camera image for display on the monitor 52, the observer is provided with a differently effective magnification of the overall beam path. This magnification can be adapted to the requirements of the application by changing the section. This can be ergonomically operated, for example, by means of an electronic speed sensor 54, which is connected to the computer 50. The actual image evaluation can also be realized in the computer 50 with the full resolution of the camera image recorded by the camera 48. A simple magnification, and at the most a 5-time magnification, is considered herein as a typical magnification for the measuring object. A greater optical magnification is realized by means of the previously described resolution adaptation. It is possible to vary the resolution range even more by adding a minor 56 and another camera 58. The switchover is carried out likewise via the computer 50. Cameras with different chip sizes and with the same pixel number as well as with different pixel numbers and equal chip sizes or both combined can be used in this. In addition, a laser proximity sensor 60 can use the same optical beam path.

In the exemplary embodiment, the camera 58 is equipped with an additional post-magnification optic 62 for the purpose of defining the image scale. The optical splitter or minor utilized in the beam path, which is identified with the reference numerals 56 and 64 in FIG. 3, is configured in such a way that all the affected cameras 48, 58 or sensors 60 are provided with the same light intensity after splitting. A bright field incident light is realized via a further optical splitter 66 and an illuminating arrangement 68. In addition to the described mode of operation, a camera image with an even higher resolution can be displayed by means of resampling from the respective recorded camera image with the purpose of an even higher magnification. Additional image points are mathematically determined via interpolation between real measured image points.

Figure 4:
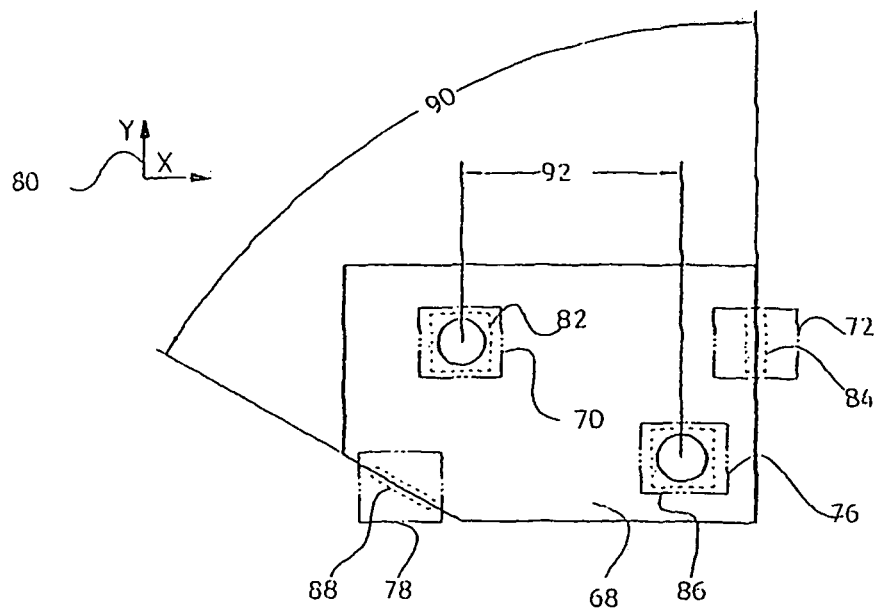
FIG. 4 shows a schematic diagram of a measuring process.

One problem of the known coordinate measuring apparatus consists in the fact that programs that have been generated for measuring workpieces must later be modified, or additional features must be subsequently generated from the already obtained measurement results. This is not possible according to the current state of the art, since the corresponding related technology data are no longer available. In order to solve this problem, the invention provides for the storage of the measuring points or video images or X-ray images as well as their corresponding positions and technology parameters, such as the default value of the used illumination system, the light intensity or magnification of the used objective of the coordinate measuring apparatus, recorded during the measurement procedure with one or several sensors of the coordinate measuring apparatus, making them available for subsequent evaluation. Similar to the described mode of operation, it is also possible to separately measure several partial images of a measuring object with the image processing sensor and to join these to form an overall image of the overall measuring object or to form an overall image of partial areas of the entire measuring object. This image can be stored and later evaluated at a separate workstation. For this purpose, the calibration parameters of the coordinate measuring apparatus used for recording the image are likewise stored and used again in the evaluation of the software. This should be explained in principle with reference to FIG. 4.

A measuring object 68 is to be measured with an image processing sensor. Image sections are identified by the reference numerals 70, 72, 76, 78, which are recorded on the measuring object 68 at different positions of the X, Y coordinate system 80 of the coordinate measuring apparatus. In addition to the actual X and Y positions, the image contents of the object sections recorded at the respective positions are stored, together with the respectively corresponding image processing value windows 82, 84, 86, 88, as well as the parameters stored for this purpose in the coordinate measuring apparatus, such as the magnification of the used objective and the default value of the illumination system used. After all these values have been recorded, the actual measurement of the image contents and the linkage, for example, the measurement of an angle 90 or a distance 92, can then be carried out offline in an evaluation computer.

Figure 5:
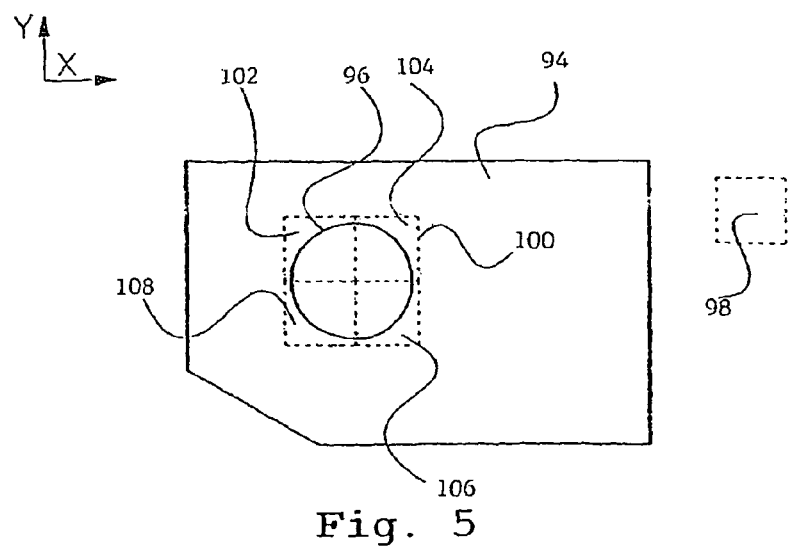
FIG. 5 shows a further schematic diagram of a measuring process.

For the case in which the visual field of the camera is insufficient to record a defined area of the measuring object at one time by selecting the desired evaluation range (image processing window) when an image processing sensor is used, an image made up of several joined parts is automatically formed, which is then presented to the user as a measured image and is made available for evaluation. This is made clear in principle with reference to FIG. 5. A feature in the form of a bore 96 is to be measured on a measuring object 94. The visual field 98 of an image processing sensor is insufficient to fully acquire this feature. The operator sets up an evaluation range 100, which is clearly greater than the visual field 98. The software detects this automatically and defines four positions 102, 104, 106, 108 in the exemplary embodiment, which are measured one after the other in order to form the overall image and metrologically record the feature to be measured, that is, the bore 96 in the exemplary embodiment.

Figure 6:
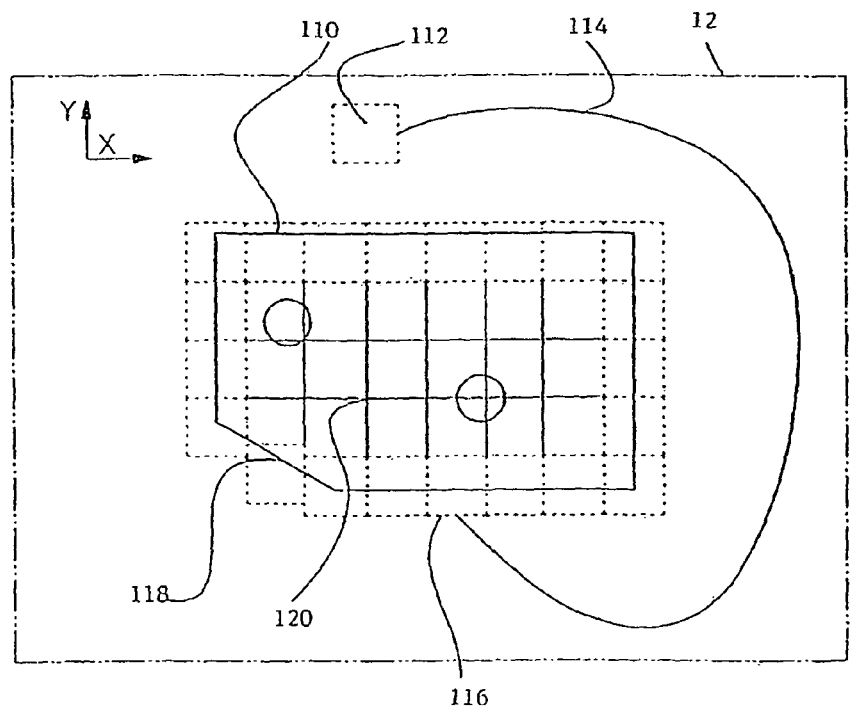
FIG. 6 shows a schematic diagram of a contour track.

The following process steps for measuring with an image processing sensor, which are carried out one after the other, are clarified by means of FIG. 6:

Searching for the measuring object within the measuring area of the coordinate measuring apparatus by driving the sensor over a straight-line, spiral-shaped, meander-shaped, circular-shaped, or stochastic or otherwise shaped search path, until the existence of a measuring object is detected, and Starting a scanning of the outer contour of the measuring object (contour tracking in order to record the geometry and position of the outer contour of the measuring object).

As an option, the measuring points located within the outer contour can also be recorded on the measuring object by means of rastering with an image processing sensor and/or by scanning with other sensors.

Thus a measuring object 110 is placed on the measuring table 12. An image processing sensor used for the measurement has an evaluation range 112. The basic position of the measuring object 110 on the measuring table 112 can be detected by means of a movement over, for example, a spiral-shaped path 114, by changing the image content. An outer contour scanning of the measuring object 110 until a complete recordation of the outer contour along the path 118 (contour tracking) starts at the meeting point of the image processing sensor with the object contour (area 116). Thereafter, in order to achieve a complete recordation of the overall object, a raster-shaped recordation of the inner area of the measuring object 110 is carried out within the previously defined outer boundaries 120, so that the overall object 118 is then available for evaluation.

One problem with the use of coordinate measuring apparatus with image processing sensors consists in the fact that the different illumination systems do not have linear characteristics. This leads, among other things, to the fact that different measuring objects cannot be correctly measured, or programs cannot be transferred without problems from one apparatus to the other. In order to solve this problem, it is proposed according to the invention to record the characteristics of the illumination devices of the image processing sensor system of the coordinate measuring apparatus, that is, to detect the dependency of the illumination intensity on the adjustment image of the operator interface of the measuring apparatus by measuring the intensity with reference to the corresponding default value with the image processing sensors. The corresponding measuring results are stored as a characteristic in the computer of the measuring apparatus. It is also possible to store the measured values in a so-called light box, which carries out the control of the illumination intensity during the operation of the coordinate measuring apparatus. If this light characteristic measurement is carried out based on a calibrated reference object or at least for several apparatus based on a standard calibration object, the possibility is provided of ensuring that the apparatus are balanced with regard to their behavior to the outside, that is, with regard to their behavior in reference to the dependency between the default value light and the physical illumination value, and thus the program transferability of different apparatus.

In order to facilitate operation of the apparatus, it is practical to correct the characteristic in such a way that a linearity is preset for the operator, that is, the previously measured characteristic is taken into consideration in such a way during the operation of the coordinate measuring apparatus that a linear characteristic is apparently available for the operator. The default values and the illumination intensity are then in linear relationship with one another. The increase of this linear characteristic can then be balanced for several devices by means of a simple correction factor.

Figure 7:
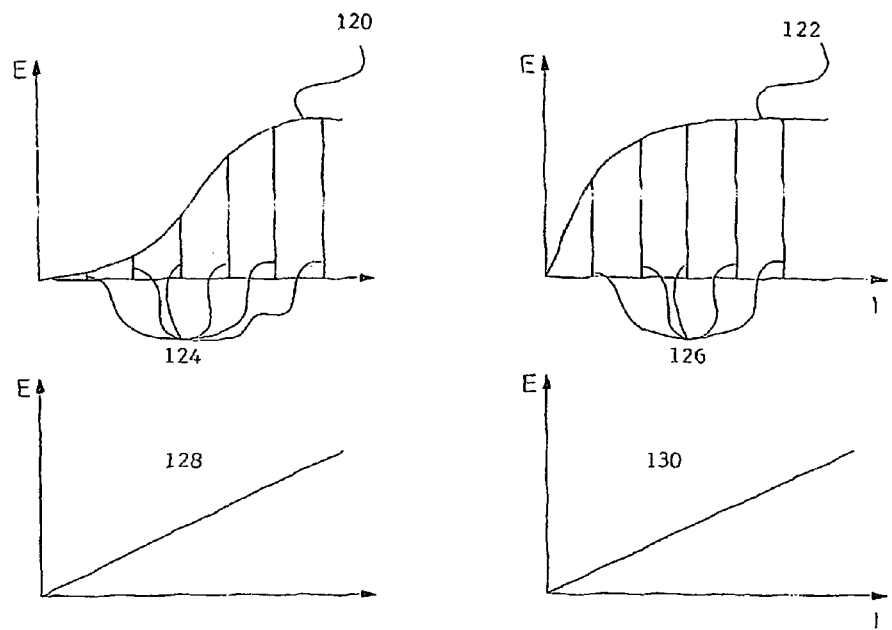
FIG. 7 shows light intensity curves.

An original light characteristic 122 of an illumination system for an optical coordinate measuring apparatus is shown at the top left in FIG. 7. The illumination intensity E does not depend linearly upon the current flow I through the illumination source. In the graphs shown at the top right in FIG. 7 a similar characteristic 122 of a second coordinate measuring apparatus is represented, which is different in detail. By recording the dependency of the illumination intensity E upon the current flow I at the support points 124 and 126 of the characteristics 120 and 122, respectively, and storing this support point information in a control computer for the illumination adjustment, the latter are corrected by dividing the standard value for adjusting the current I in such a way that an identical linear characteristic is obtained for both measuring apparatus. These are shown in the lower drawings of FIG. 7 and are identified with the reference numerals 128, 130. As a result, the same illumination intensities are achieved with a standard value.

Figure 8:
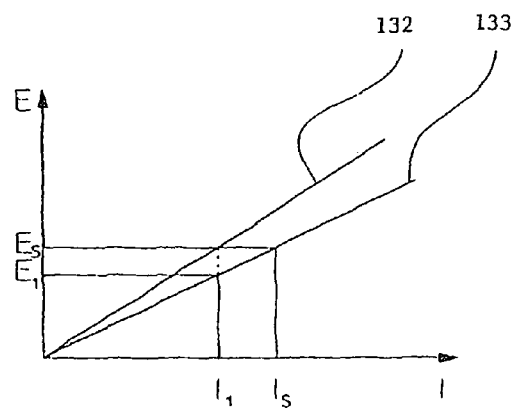
FIG. 8 shows a desired and an actual light intensity curve.

FIG. 8 shows the mode of operation for controlling the light intensity E. A light characteristic 132 becomes effective in the teach-in mode when a coordinate measuring apparatus is combined with a measuring object, for example, in the incident light, when a CNC program for measuring, for example, using image processing sensors, is prepared. The desired value of the illumination intensity $E_S$ is adjusted by means of the illumination current $I_1$. If another measuring object or another point on the measuring object is then measured, it is possible for the reflection properties of the material to have changed, which leads to a change in the increase of the light characteristic. This second light characteristic 133 is likewise shown in FIG. 8. If now the illumination intensity is measured after adjusting the current $I_1$, the illumination intensity $E_1$ is determined as a result. This does not correspond to the desired value $E_S$. Since the increase in the now current value light characteristic is known from $I_1$ and $E_1$, the necessary current $I_S$ can be easily calculated in order to adjust the desired-actual intensity $E_S$.

Figure 3:
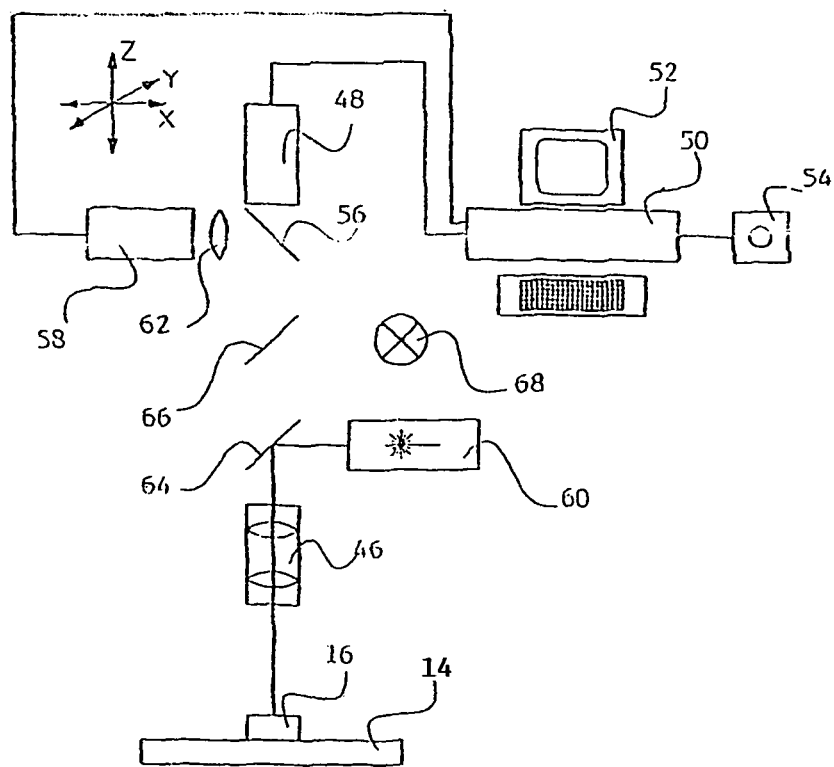
FIG. 3 shows a schematic diagram of a coordinate measuring apparatus with image processing and laser proximity sensor.

The physical design of the previously described procedure can be seen in FIG. 3, in which the light source 68, the mirror 66, and the objective 46 represent the illumination device. The calculation is carried out via the computer 50. The reflection behavior of the measuring object 16 is different within the measuring object and produces the different reaction to the current I and the illumination intensity E.

With the coordinate measuring apparatus it is possible to scan contours on workpiece surfaces. This can be realized with a sensor or also with the combined operation using several sensors. If an evaluation of the contours is carried out by comparing these with desired contours from, for example, CAD files, it is necessary to internally superimpose the desired and actual computers in order to realize a graphic comparison. This is not possible by means of a simple displacement of the relative position or rotation of the relative position in particular with flexible or elastic parts, because the parts are elastically deformed. This problem is solved by proceeding according to the method having inventive features, which will be described in the following. In the best adaptation between the desired and actual contour, aside from the relative position change between the desired and actual contour per se, the length of contour sections is also changed according to the desired length, while maintaining the curvature or alternatively the contour curvature while maintaining the contour length on the actual contour, in such a way that an optimal coverage with the desired contour is achieved. If parts with recorded geometry features are difficult to check due to their elasticity or deformation, this procedure can be reinforced by carrying out the adaptation between actual and desired contour on a group of actual and desired contours on individually recorded features, such as intersection points of contours or circular structures or other recurring structures, thus generating a distortion of the actual contour for an optimal coverage with the desired contour. This is possible in a similar way in cylindrical parts in which the contours measured on the cylinder surface are partially rotated or screwed on the cylinder jacket surface in order to produce an optimal coverage between the desired and actual contours. This mode of operation is offered especially for the measurement of the stents that are customary in medicine. The above-described method is also possible in a similar reverse mode of operation, that is, the adaptation of the desired to the actual geometry.

Figure 9:
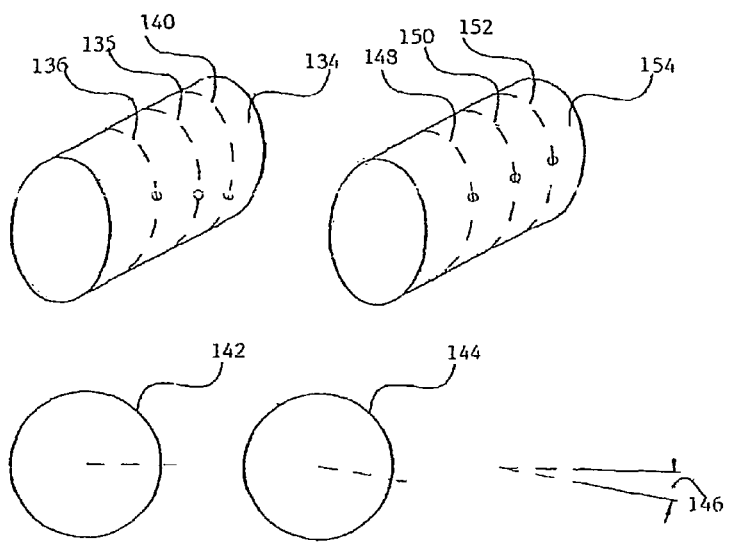
FIG. 9 shows a comparison of desired and actual contour data.

FIG. 9 clarifies in principle that the actual contour for optimal coverage with the desired contour is partially rotated or screwed in a cylinder jacket surface. A point cloud is identified with reference numeral 134, which is represented essentially by means of a cylinder-shaped jacket surface. Due to the distortion of the measuring object, the structures on this cylinder-shaped jacket surface are mutually rotated or twisted along the cylinder axis. This torsion is mathematically compensated by reverse rotation of the structures into the starting position based on the teaching of the invention. This is realized by comparing the respective sections of the measuring point cloud transversely to the cylinder axis via a desired to actual comparison to the corresponding desired data, and by calculating from this the necessary rotated position for the respective section. This is then carried out for any desired number of sections through the cylinder axis, or the torsion is corrected by interpolation between individual sections. In the bottom part of FIG. 9, sections and a desired to actual comparison and reverse rotation are represented. As was mentioned, the measuring point cloud identified with the reference numeral 134 is a measuring object having a cylindrical shape. The measuring point cloud 134 is represented with a torsion, wherein a differently strong torsion is present in the sections 136, 138, 140. In these section planes, a desired point position 142 is compared with an actual point position 144 according to the representation in the lower part of FIG. 9, and the torsion angle 146 is calculated from this. This procedure is repeated for the different sections 136, 138, 140, and the measuring points are interpolated between them. A measuring point cloud with torsion correction in the section planes 136, 138, 140 is thus obtained. The corrected section planes are identified with the reference numerals 148, 150, 152 in the upper right section of FIG. 9. It is thus possible, for example, to establish the evaluation windows for the subsequent image processing sensors at the locations allocated to the structures according to the desired data. The point cloud corrected to the point cloud 134 is provided with the reference numeral 154.

Figure 10A:
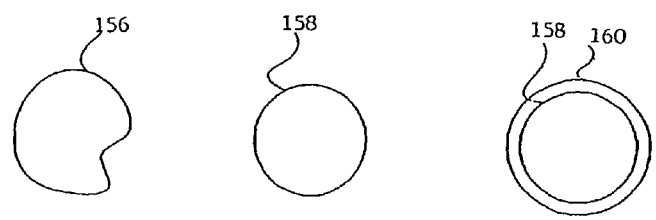
FIGS. 10a, 10b show desired and actual contours.
Figure 10B:
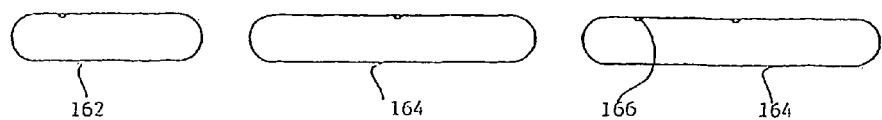

FIG. 10 a shows an example of how a better coverage with respect to a desired contour 158 can be produced therewith for subsequent comparison from an actual contour 156 by changing the curvature while maintaining the length. The circle 160 shows herein that a better adaptation to the desired contour 158 is made possible by means of curvature changes at a constant length (in this case the periphery).

FIG. 10 b shows how a better coverage between desired and actual value is made possible for the purpose of a subsequent comparison, while maintaining the curvature of the contours by changing the length of the contour sections. Therein, the actual contour is identified with the reference numeral 162 and the desired contour is identified with the reference numeral 164. The contour 166 is the actual contour adapted to the desired contour 164 by means of stretching, while the curvature is retained.

According to the invention, the tolerance zones allocated to the desired or actual contour can be evaluated during the evaluation of the deviation between the desired and the actual contour. The tolerance zones are therein automatically drawn from the measured value data of a CAD drawing or alternatively defined by means of operator data. The process will be described in more detail on the basis of the explanations with regard to FIGS. 11 and 12.

Figure 11:
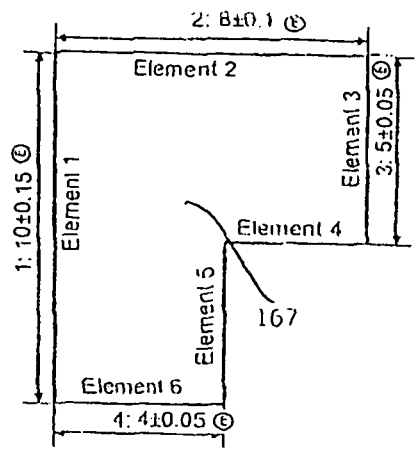
FIGS. 11, 12 show a measuring object with tolerance zones.

A workpiece 167 consisting of the elements 1 to 6 with corresponding measurements (measurement 1 to measurement 4) as well as the tolerances corresponding to the measurements are thus represented in FIG. 11. The corresponding measurements and tolerances can be taken from a CAD drawing or alternatively defined by means of operator data. In a first step, a two-sided symmetric tolerance zone is allocated to all the elements in the presented example according to the invention, which can have different widths for each element. In FIG. 11 it can be seen that two tolerance zones of different widths had to be allocated to the element 1 by means of the measurement 2 with reference to the element 3 and by means of the measurement 4 with reference to the element 5. Different tolerance zones are similarly to be allocated to the element 2 with reference to the element 4 by means of the specification of the measurement 3 and with reference to the element 6 by means of the specification of the measurement 1. The calculation and allocation of the different tolerance zones to the elements is carried out according to the invention by means of the analysis of all reference dimensions, which are defined for an element within the drawing and by means of an automatic subdivision of the tolerance zones for each drawing element according to the reference dimension available for the element.

Figure 12:
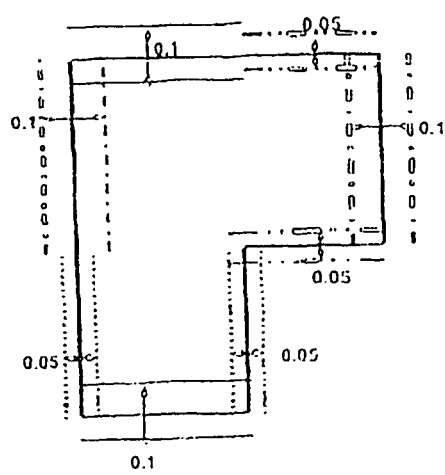

In the present example, this means that two tolerance zones (refer to FIG. 12) are automatically defined for the element 1. The upper tolerance zone is produced by the tolerance allocated to the measurement 2, and the lower tolerance zone is produced by the tolerance allocated to the measurement 4. Accordingly, two tolerance zones are allocated to the element 2, wherein the left tolerance zone for the element 2 shown in FIG. 12 is produced from the tolerance zone allocated to the measurement 1, and the right tolerance zone for the element 2 is produced from the tolerance zone allocated to the measurement 3. In a first step, the measuring points recorded on the real workpiece 166 are allocated according to their position to one of the automatically determined tolerance zones. In order to test that the tolerance zones are being maintained, the measuring points allocated to the respective tolerance zones are adapted in the best possible way to the tolerances defined by the desired contour in the workpiece 166 without fixing any degree of freedom, wherein the adaptation conditions are automatically selected based upon the tolerance type. The corresponding testing with regard to the tolerance zone evaluation is carried out sequentially for all tolerance zones and all measuring points respectively allocated to these tolerance zones.

Figure 13:
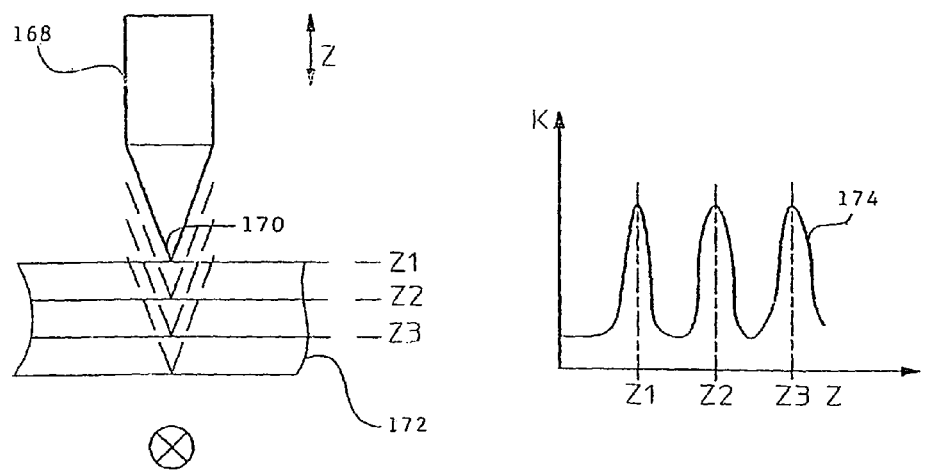
FIG. 13 shows an arrangement for measuring partially transparent layers.

When using an image processing with autofocusing sensors the problem frequently arises that the height of partially transparent layers must be measured. For this purpose, the invention proposes to generate autofocus measuring points for multiple evaluation areas simultaneously on several semitransparent layers with the image processing sensor in the autofocusing operation. This is realized by moving the image processing sensor in the measuring direction and at the same time recording several images. The focus measuring points are calculated according to a contrast criterion within the respectively established evaluation ranges. This is shown in FIG. 13. An image processing sensor 168 is moved in such a way for the realization of an autofocusing process according to the Z axis that the focus point 170 of the sensor 168 is placed in different positions within the semitransparent measuring object 172. In this way the contrast characteristic 174 is acquired. Each maximum of the contrast characteristic represents the location of the respective semitransparent layer between different material layer types, and from this contrast curve 174 the correspondingly allocated Z positions Z1, Z2 and Z3 can then be calculated. The usual processes for contrast autofocus measurement can be used herein.

Figure 14:
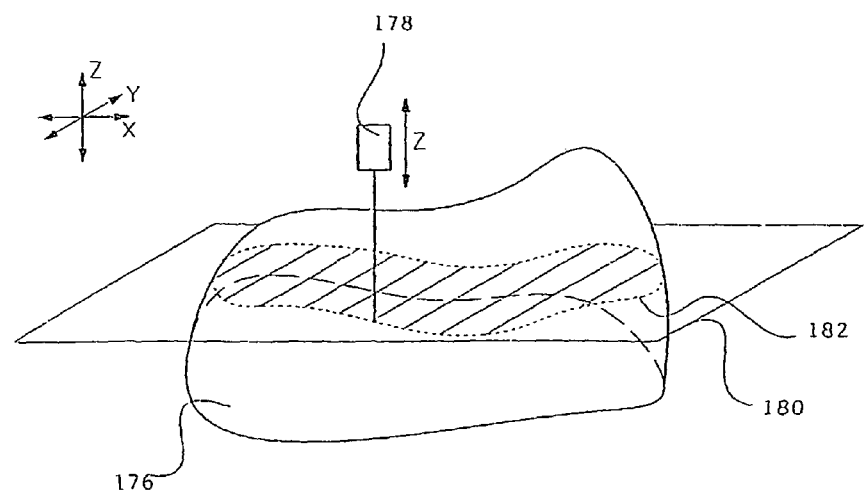
FIG. 14 shows a measuring arrangement for measuring an elevation profile.

With laser proximity sensors in coordinate measuring apparatus, contours on workpiece surfaces are scanned in the sensor direction, that is, the coordinate measuring apparatus is moved over a predetermined path in a direction that is different from the sensor measuring direction. It is now provided according to the invention that the position control of the sensor or the position control circuit of the coordinate measuring apparatus is controlled in such a way, based upon the deviation display of the laser proximity sensor, that the deviation of the laser proximity sensor remains constant. In this way, it is possible to scan contour lines on a measuring object. A corresponding contour line scanning is clarified in FIG. 14. A measuring object 176 rests thus on a measuring table of a coordinate measuring apparatus and is scanned with a proximity sensor, such as a laser proximity sensor 178, of the coordinate measuring apparatus. The laser proximity sensor 178 is basically set into motion therein in such a way that the distance to the material surface is constant. In the concrete case, the Z position of the sensor 178 is kept constant, and by controlling the X and Y positions it is achieved that the sensor measuring point remains always within a plane 180, thus a contour line 182 on the measuring object 176 is scanned.

Figure 15:
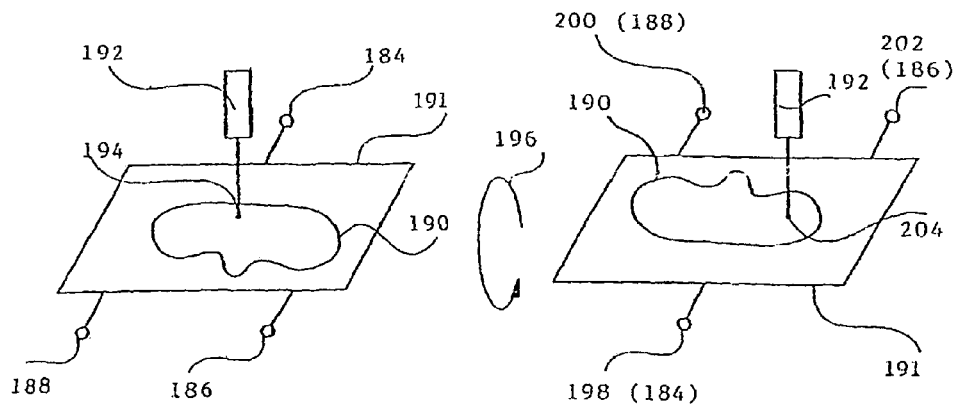
FIG. 15 shows a measuring arrangement for measuring a measuring object in different positions.

Another problem caused by the use of coordinate measuring apparatus consists in the fact that the measuring objects must be measured from different sides. However, if the position of the measuring object in the coordinate measuring apparatus is changed, the reference of the measuring points among each other is lost, and a mutual evaluation of the measuring point is no longer possible. In order to prevent these disadvantages, the following steps are carried out (FIG. 15):

Measuring the position of one or several, preferably three, reference marks 184, 186, 188 in the form, for example, of spheres on the measuring object 190 or a holder 191, such as a frame, that accommodates the measuring object 190, Storing the position in the computer of the coordinate measuring apparatus, Measuring any desired points 194 on the measuring object 190 that are accessible by means one or several sensors 192, Changing the position of the measuring object 190 within the measuring volume of the coordinate measuring apparatus manually or by means of an integrated rotary axis or rotary pivoting axis (arrow 196), Again measuring the reference marks 184, 186, 188 and determining their changed position 198, 200, 202 within the measuring volume of the coordinate measuring apparatus, Internally adapting the respective reference marks 184, 186, 188 or their positions 198, 200, 202 in such a way that a minimized offset is present between them within the software, Measuring further points 204 on the measuring object 190 with one or several sensors 192 of the coordinate measuring apparatus, Repeating the above-mentioned procedures any number of times, Jointly evaluating all the measuring points 194, 204 of the measuring object 190 recorded during the above-described measuring cycles within a coordinate system.

Coordinate measuring apparatus with different sensors also have, among other things, selective sensors with an optotactile sensing device. Therein, the determination of the position of the molded scanning element (sphere or cylinder) is carried out by means of an image processing sensor. The problem consists in the need to adjust this sensor to the position of the scanning sphere. This can be solved according to the invention by additionally arranging an adjustment unit, which enables a relative adjustment between the molded scanning element (scanning sphere including scanning pin and holder) and the image processing sensor, on the coordinate axis that carries the sensor. For example, an automatic focusing of the molded scanning element is possible in relation to the image processing sensor via an autofocusing process.

Figure 16:
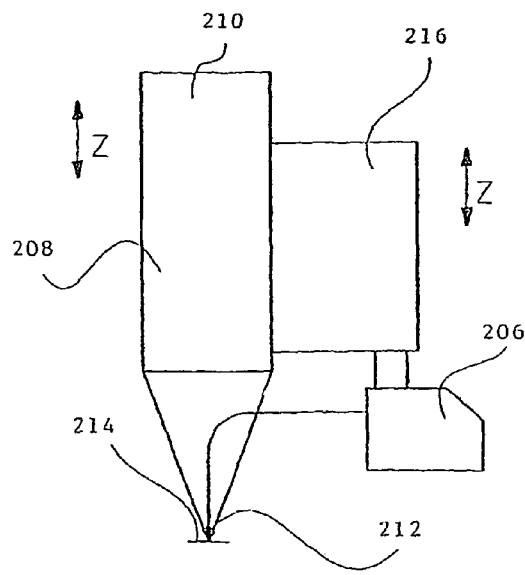
FIG. 16 shows an arrangement for determining the position of a molded scanning element.

A tactile/optical sensor 210 (also called an optotactile sensor) is thus arranged in a coordinate measuring apparatus on an adjustment axis 208, which is positioned on a coordinate axis of the coordinate measuring apparatus, preferably the Z axis 208, which coincides in the exemplary embodiment with the optical axis of an optical sensor 210. By means of the separate control of a second Z axis (adjustment device 210), it is made possible to adjust the relative position of the molded scanning element 212 of the tactile/optical sensor 206 to the focal plane 214 of the optical sensor 210 in a suitable manner (FIG. 16).

Coordinate measuring apparatus are generally exposed to different working temperatures at the places where they are installed. If several sensors are mounted on the coordinate measuring apparatus, this leads to thermally induced changes in the positions between the different sensors. This leads to measurement errors. In order to compensate for this, the temperature of the mechanical components that serve for mounting the different sensors at one or several locations is measured at one or several locations, and the expansion of the corresponding mechanical components is taken into consideration when calculating the measuring points that are recorded by the different sensors.

Figure 17:
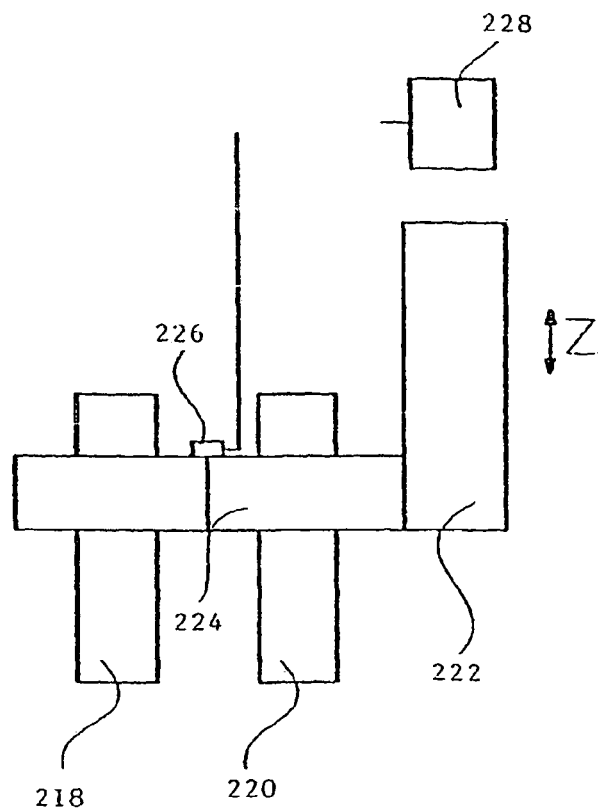
FIG. 17 shows an arrangement with two mutually connected sensors.

Thus FIG. 17 shows, for example, an arrangement with two sensors 218, 220 on a Z-axis 222 of a coordinate measuring apparatus. To the sensors 218, 220 are mutually connected one or several connecting elements 224 together and the Z axis 222. The temperature of the connecting element or elements 224 during the measurement is constantly measured by means of a temperature sensor 226, and the corresponding position change is corrected via an evaluation computer 228 and taken into consideration in the measuring results.

In order to be able to measure a measuring object from several sides during the measuring procedure on a coordinate measuring apparatus, it is practical to clamp the measuring object in a rotational axis and thus rotate it into an optimal position for measurement with the different sensors. In addition, it is possible to hold the measuring object, aside from with the rotational axis, also with a correspondingly arranged countertip. However, when the measuring object is clamped between tips, the problem is created that the tensile force of the countertip can lead to deformations of the measuring object. In order to preclude the errors caused by this, it is proposed according to the invention to constantly deform the measuring object or to automatically position the countertip on the measuring object until a predefined force is achieved. In this way, the countertip is elastically mounted, so that the correspondingly required force can be determined via a deflection and a corresponding end switch.

Figure 18:
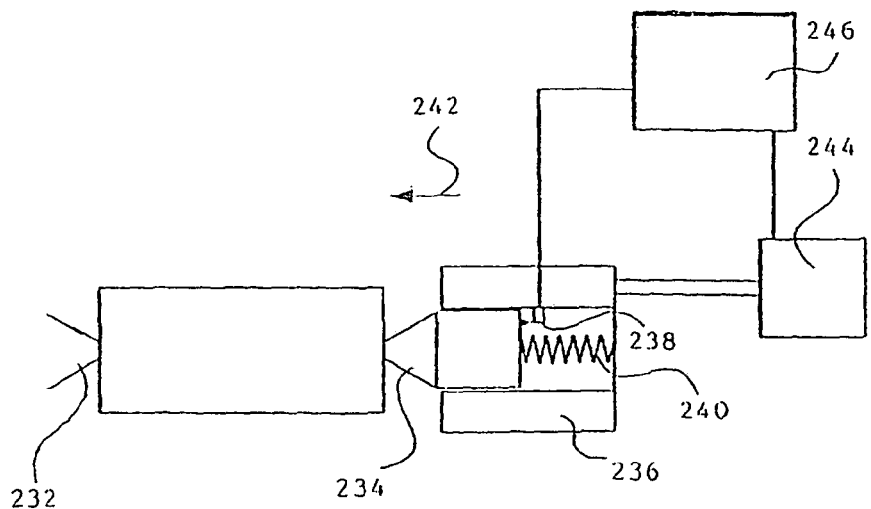
FIG. 18 shows a clamping arrangement for a measuring object.

FIG. 18 thus shows, when a measuring object 230 is clamped, how the tip 232 and countertip 234 are pushed up to a point by means of a guide 236 against the measuring object 230 until the countertip 234 interacts with an end switch 238. A pretension can be produced therein, for example, by means of a loaded spring 240, wherein the delivery motion (arrow 242) of the countertip 234, which is achieved by means of a corresponding drive 244 on the guide 236, is interrupted when the countertip 234 acts on the end switch 238 or on an equally acting element. The pretension force of the clamped measuring object 236 is thus clearly defined.

Figure 19:
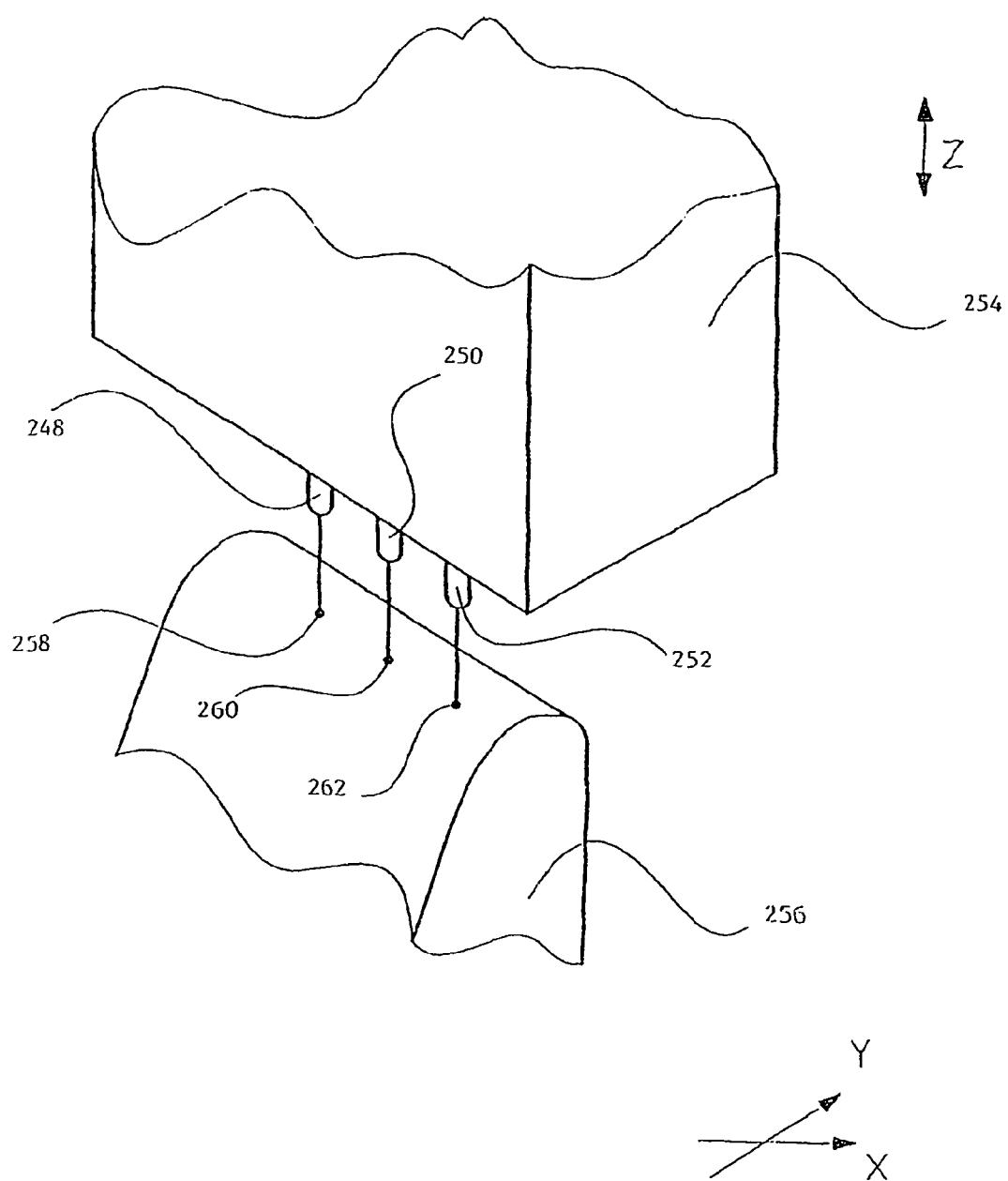
FIG. 19 shows a sensor operation for measuring several measuring paths.

A further problem with regard to the use of coordinate measuring apparatus consists in that several contours are frequently to be measured closely together. With the required number, this frequently leads to measuring times of considerable length. This problem is solved according to the invention by arranging several tactile sensors of the same kind or of different design closely together on a mutual mechanical axis of the coordinate measuring apparatus. FIG. 19 shows an example. In this way, several tactile sensors 248, 250, 252 are arranged on a mutual Z-axis 254 of a coordinate measuring apparatus. Measuring points 258, 260, 262 for different positions, which are then jointly evaluated in the coordinate measuring apparatus, can thus be measured simultaneously when a measuring object 256 is scanned.

Figure 20:
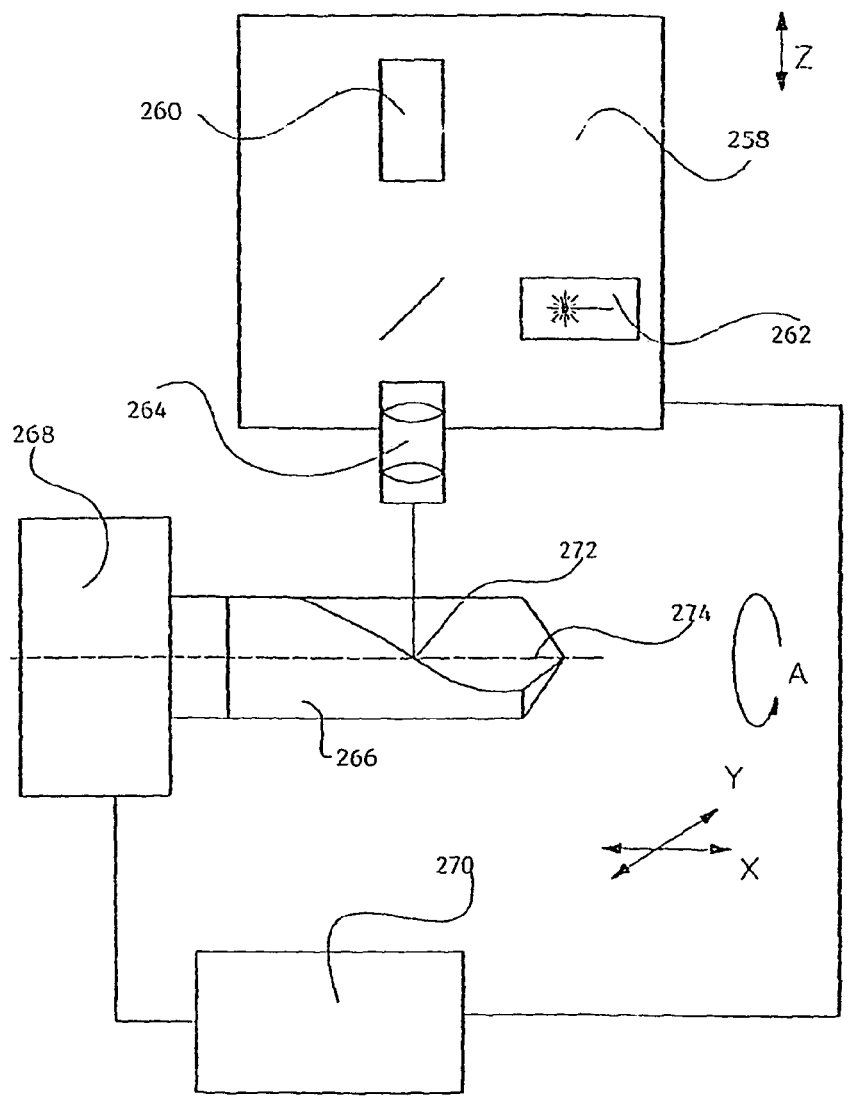
FIG. 20 shows an arrangement for measuring a workpiece.

During the measurement with an image processing sensor on the outer edges of workpieces, such as cutting tools, there is always the problem that the image processing sensor has to be permanently refocused on the outer edge to be measured. This problem can be solved according to the invention by additionally integrating a laser proximity sensor in the image processing beam path. The laser sensor measures the distance from the image processing sensor to the workpiece surface in the vicinity of the outer edge to be measured, and is connected in such a way to a position control circuit of the coordinate measuring apparatus that an automatic tracking takes place. The image processing sensor is thus permanently focused. This is shown in principle in FIG. 20. On a Z axis 258 of a coordinate measuring apparatus, two mutually combined sensors 260, 262 for image processing and laser proximity measuring are combined, which record measuring points on a tool 266 via a mutual optical system 264. The rotational axis 268 of the tool 266 is controlled in such a way by means of a computer and control system 270 of the coordinate measuring apparatus, which also has available the sensors signals of the coordinate measuring apparatus, that the measuring points on a clamping surface 272 of the tool 266 measured with the laser proximity sensor 262 influence the settings of the rotational axis 268 in such a way that the cutting edge comes to rest at this location within the cutting plane 274 of the tool. It is therefore possible to measure the outer contour of the corresponding tool with the image processing sensor 260 of the same coordinate measuring apparatus. This procedure can be continuously repeated with a constant rotation and moving of the X, Y and Z axes of the coordinate measuring apparatus, and a scanning in all three coordinates can be simultaneously carried out.

In a coordinate measuring apparatus according to the invention image processing sensors with laser sensors integrated within the beam path can be used. With systems used in practice it can be expected that the desired optical properties of the integrated laser proximity sensor and the image processing sensor are not available at the same adjustment parameters (working distance/magnification). The aperture and working distance of the zoom optic system used can be optimized alternatively to the laser sensor and the image processing sensor by means of an additional exchangeable optical attachment.

Figure 21:
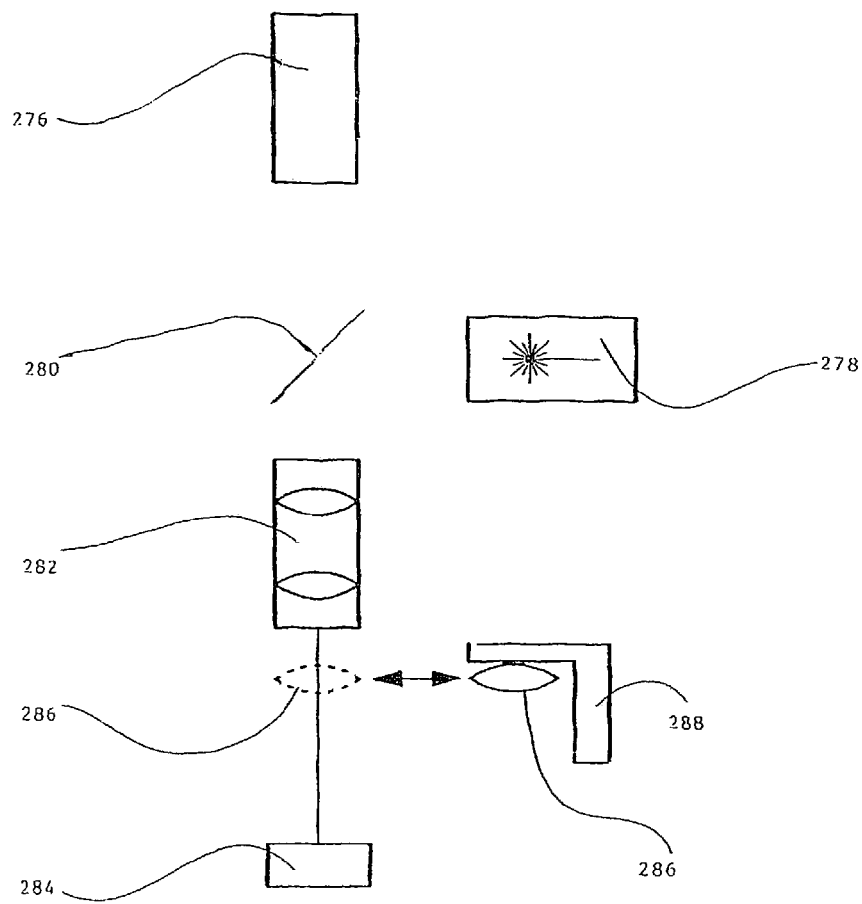
FIG. 21 shows a measuring arrangement with an image processing sensor and a laser proximity sensor.

An image processing sensor 276 and a laser proximity sensor 278, which are applied in a coordinate measuring apparatus via a beam splitter 280 with a mutual measuring objective 282, are shown in FIG. 21. A measuring object 284 should be scanned therein, in other words, in the present case, contactlessly measured. By exchanging an additional preoptic 286, which can be deposited in an exchange station 288, it is possible to change the optical properties of the overall beam path. This is determined by means of the measuring objective 282 and the preoptics 286 located or not located within its beam path. In this way, an optimization of the adjustment parameters for the laser proximity sensor 278 can be carried out with the preoptics 286 located in front, or for the image processing sensor 276 with the preoptics 286 at a distance, or vice versa.

If the surface contour of workpieces is measured with an autofocusing sensor, the measuring points are usually predetermined by the operator in the teach-in mode. This is possible only with great difficulty when unknown contours are to be measured using this process. This is prevented according to the invention by carrying out a scanning procedure on the material surface with an autofocusing sensor in such a way that the expected location of the next measuring point is theoretically calculated from the already measured focus points by interpolation, and can be exactly verified by means of a new autofocus point. If this procedure is repeated several times in succession, a fully automatic scanning is obtained. The number of points to be scanned along one line as well as an area to be scanned on the workpiece or measuring object can be predetermined by the operator. The extrapolation of the next measuring point from the two or more predetermined measuring points can be carried out by means of a linear extrapolation.

Figure 22:
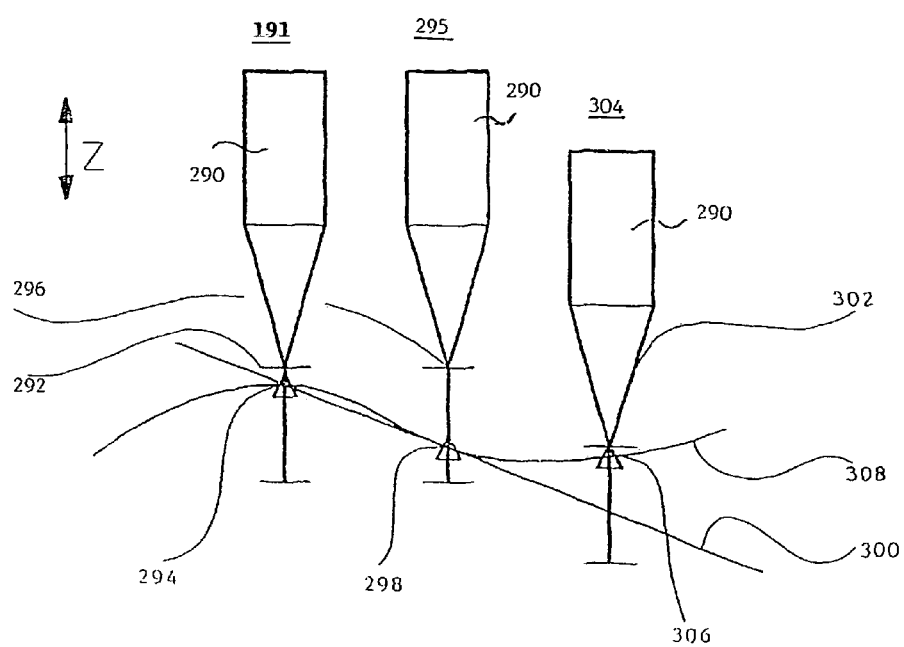
FIG. 22 shows a diagram for measuring the measuring points determined by means of extrapolation.

A corresponding process for scanning a material surface with an autofocusing sensor is thus shown in FIG. 22. An autofocusing sensor 290 is applied in a first location 191 by moving in the Z axis of the coordinate measuring apparatus in order to measure a surface point. For this purpose, the contrast behavior is recorded over a focal area 292, and the focal location 294 is calculated therefrom according to the measuring point. The same procedure is repeated at a next position 295 with a corresponding focal measuring area 296 and measuring point 298. The position of the focal measuring area 302 and thus of the sensor 290 in the position 304 is defined, for example, by means of an interpolation of a straight line 300, and a measuring point 306 is measured there. This procedure is repeated as many times as is necessary until the entire length of the contour 308 of the object to be measured or a part thereof has been measured.

With the use of image processing sensors or X-ray tomography sensors, the problem is frequently created that, depending on the property of the measuring object, areas with strong as well as with weak intensities are present within an image.

This is caused by the different reflection or transmission properties of the materials. As the result, only low signals, with the consequent bad signal to noise ratio, are present for the "dark" image areas. However, a stronger illumination or irradiation of the object would lead to an outshining in the brighter areas and is thus excluded.

These described problems are solved according to the invention by recording several images with different illumination intensities for each image section. These images of the same object area are then joined to form a new overall image in such a way that the image point amplitudes are standardized to the respectively used illumination or irradiation intensity. For joining the overall image the pixels of the respective image are also used, which are located inside the allowed dynamic range. Amplitudes with overshining of the respective image are not taken into consideration.

Figure 23:
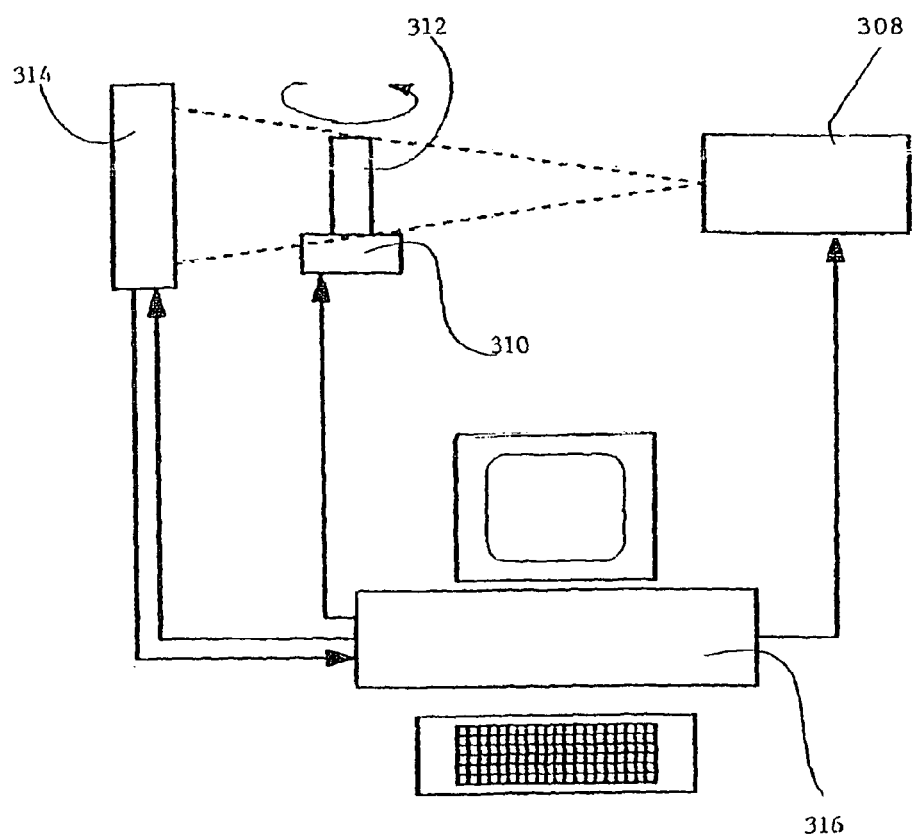
FIG. 23 shows a schematic diagram of an arrangement with an X-ray tomography sensor.

Accordingly, an X-ray source 308, a rotary table 310 with a measuring sensor 312, and also an X-ray sensor 314 are shown in FIG. 23. The image point amplitude of the X-ray detector 314 is stored in a computer and evaluation system 316 and then accordingly evaluated and joined according to the above-described process steps. Therein, it is possible to control the X-ray frequency of the radiation source 308 as well as the recording parameters of the detector 316 according to the described mode of operation by means of the evaluation system 316.

The invention claimed is:

1. A method for measuring workpiece geometries, comprising the steps of:
   providing a coordinate measuring device having traverse axes and a plurality of sensors for recording measuring points on workpiece surfaces, said sensors being mechanically connected by a connecting element,
   measuring the temperature of the connecting element; and
   measuring the workpiece geometries by determining position alteration between the plurality of sensors caused by temperature, after consideration of the measured temperatures.

2. The method according to claim 1, wherein the temperature of the connecting element is measured at one or several locations and an expansion of the connecting element is taken into consideration when determining the measuring points that are recorded by the plurality of sensors.

3. The method according to claim 1, wherein position alteration is determined by linear multiplication.

4. The method of claim 1, wherein at least one of the plurality of sensors is an image processing sensor.

5. A coordinate measuring apparatus for measuring workpiece geometries comprising several traverse axes as well as, for recording measuring points on at least one surface of the workpiece, a plurality of sensors suitable for determining defined measuring objects,
   wherein the coordinate measuring apparatus exhibits several temperature measuring points for determining position alteration between the plurality of sensors caused by temperature.

6. The coordinate measuring apparatus according to claim 5, wherein mechanical components which serve for mounting the plurality of sensors are equipped with one or several temperature sensors, with the sensors being connected to an evaluation computer of the coordinate measuring apparatus.

7. The coordinate measuring apparatus according to claim 5, wherein at least one of the plurality of sensors is an image processing sensor.

* * * * *